(12) United States Patent
Sueshige et al.

(10) Patent No.: US 6,474,007 B1
(45) Date of Patent: Nov. 5, 2002

(54) SNOW REMOVING VEHICLE

(75) Inventors: Hiroshi Sueshige, Wako (JP); Yoshiaki Mikuni, Hanamaki (JP)

(73) Assignees: Honda Giken Kogyo Kabushiki Kaisha (JP); Wado Sangyo Co., Ltd. (JP)

( * ) Notice: Subject to any disclaimer, the term of this patent is extended or adjusted under 35 U.S.C. 154(b) by 0 days.

(21) Appl. No.: 09/511,435

(22) Filed: Feb. 23, 2000

(30) Foreign Application Priority Data

Feb. 24, 1999 (JP) .......................................... 11-046598

(51) Int. Cl.$^7$ ................................................ E01H 5/06
(52) U.S. Cl. .......................... 37/266; 180/19.3; 280/653
(58) Field of Search .......................... 37/241, 243, 264, 37/265, 266, 270, 278, 284, 285; 172/245, 247, 253, 810, 811, 817; 280/651, 47.26, 78, 653; 180/19.3, 65.6

(56) References Cited

U.S. PATENT DOCUMENTS

| | | | | |
|---|---|---|---|---|
| 2,720,043 A | * | 10/1955 | Chamberlin | 37/53 |
| 2,732,638 A | * | 1/1956 | Leufvenius | 37/43 |
| 2,768,453 A | * | 10/1956 | Adams, Jr. | 37/43 |
| 4,023,287 A | | 5/1977 | de Brito | 378/43 R |
| 4,048,735 A | * | 9/1977 | Brunty | 37/130 |
| 4,462,172 A | * | 7/1984 | Caron | 37/231 |
| 4,532,725 A | * | 8/1985 | Trejo et al. | 37/243 |
| 4,669,206 A | * | 6/1987 | Yost | 37/285 |
| 4,910,893 A | * | 3/1990 | Asay | 37/281 |
| 4,987,731 A | * | 1/1991 | Cianciulli et al. | 56/17.5 |
| 5,048,206 A | * | 9/1991 | Jones | 37/265 |
| 5,064,011 A | * | 11/1991 | Ogano et al. | 180/9.22 |
| 5,123,187 A | * | 6/1992 | Zamaria | 37/265 |
| 5,511,327 A | * | 4/1996 | Jurkowski et al. | 37/285 |
| 5,520,253 A | * | 5/1996 | Kesting | 172/125 |
| 5,581,915 A | * | 12/1996 | Lobato | 37/285 |
| 6,129,166 A | * | 10/2000 | Sueshige et al. | 180/65.6 |
| 6,163,987 A | * | 12/2000 | Schommer | 37/407 |
| 6,173,799 B1 | * | 1/2001 | Miyazaki et al. | 180/19.3 |

FOREIGN PATENT DOCUMENTS

| | | |
|---|---|---|
| EP | 0867353 | 9/1998 |
| EP | 0887469 | 12/1998 |
| GB | 2278622 | 4/1993 |
| JP | 50-30171 | 9/1975 |
| JP | 57-41075 | 9/1982 |

* cited by examiner

*Primary Examiner*—Victor Batson
(74) *Attorney, Agent, or Firm*—Adams & wilks

(57) ABSTRACT

A snow removing vehicle has a vehicle body frame and a snow removing member connected directly to a front part of the vehicle body frame for removing snow from a ground surface. The snow removing member has a generally arc-shaped portion curved concavely rearward from the front part of the vehicle body frame. A single wheel axle is rotatably mounted on the vehicle body frame and is disposed in a widthwise central portion thereof so that the vehicle body frame is pivotally movable about the single wheel axle. At least one wheel is mounted on the single wheel axle. A pair of operational handles are connected directly to a rear part of the vehicle body frame so that upward and downward movement of the right and left operational handles relative to the ground surface pivots the vehicle body frame relative to the single wheel axle. When the operational handles are moved upward during removal of snow by the snow removing member, the vehicle body frame and the snow removing member pivot about the single wheel axle so that the front part of the vehicle body frame is inclined downwardly relative to the ground surface and both the driving wheel and a lower end portion of the snow removing member contact the ground surface or a surface of the snow and a chord of the arc-shaped portion extends generally perpendicular to the surface of the ground.

23 Claims, 19 Drawing Sheets

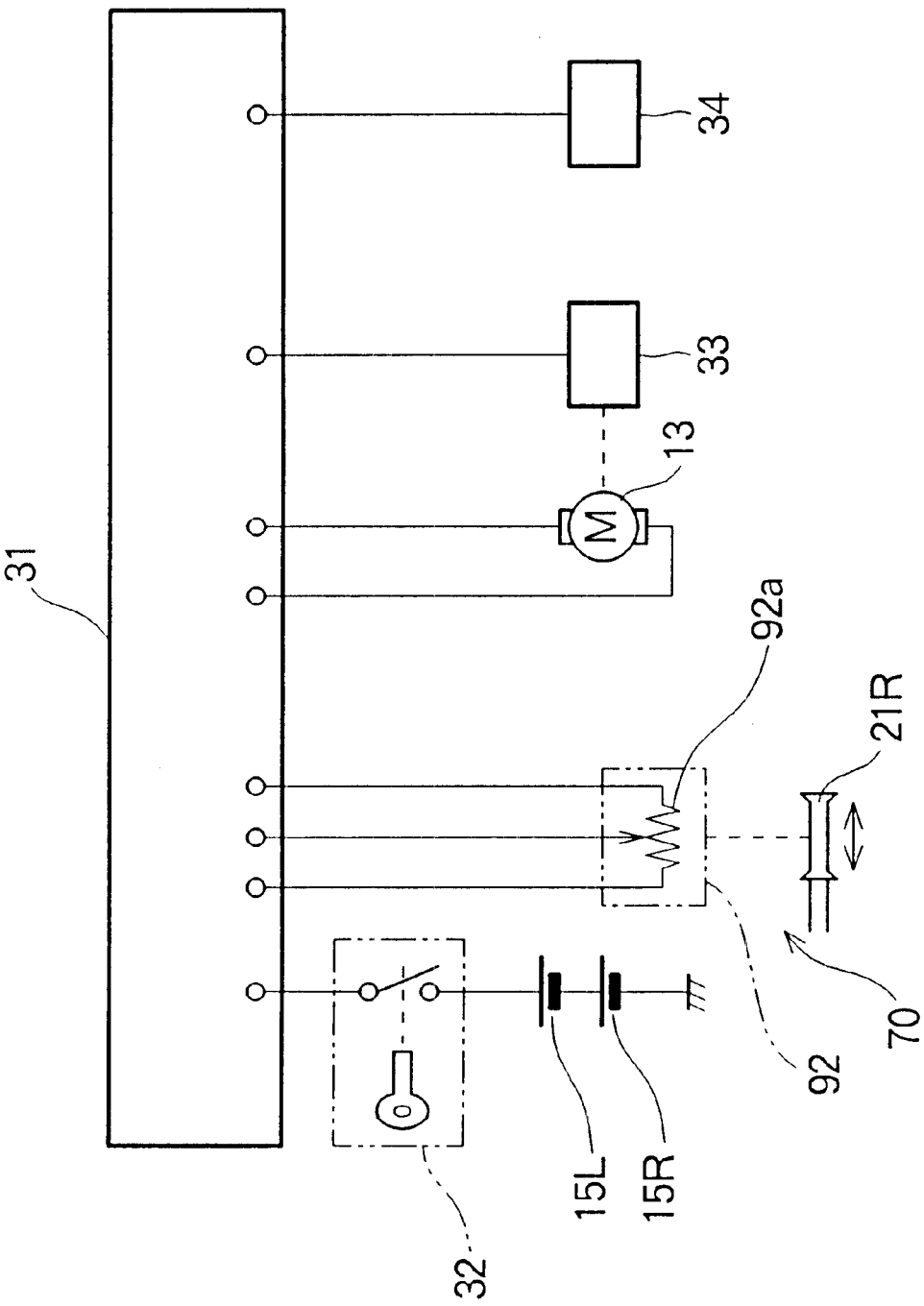

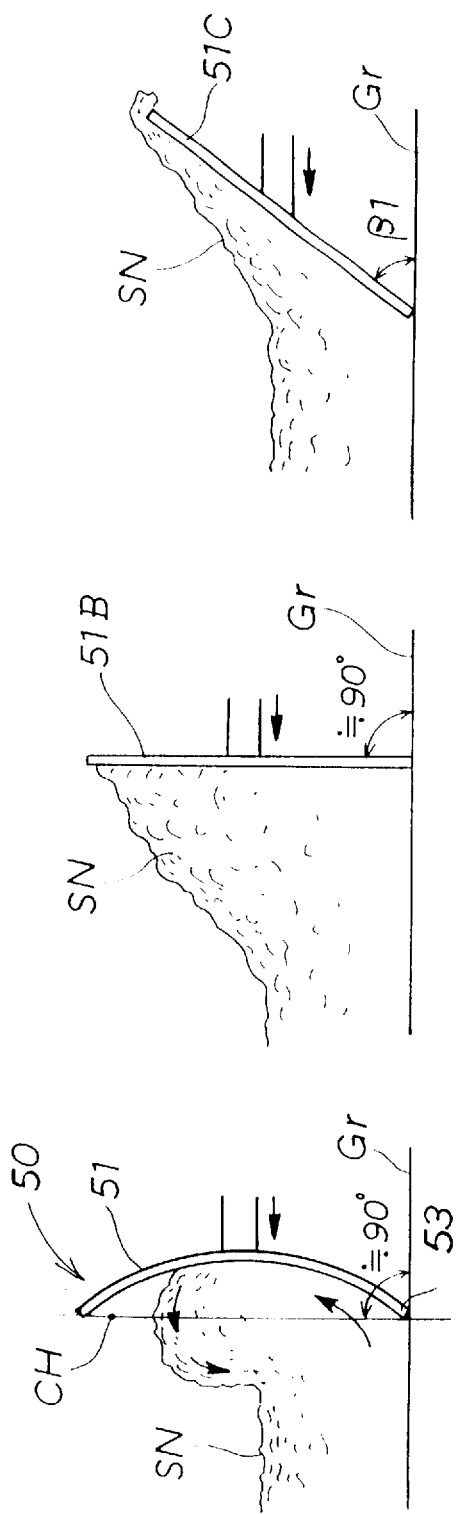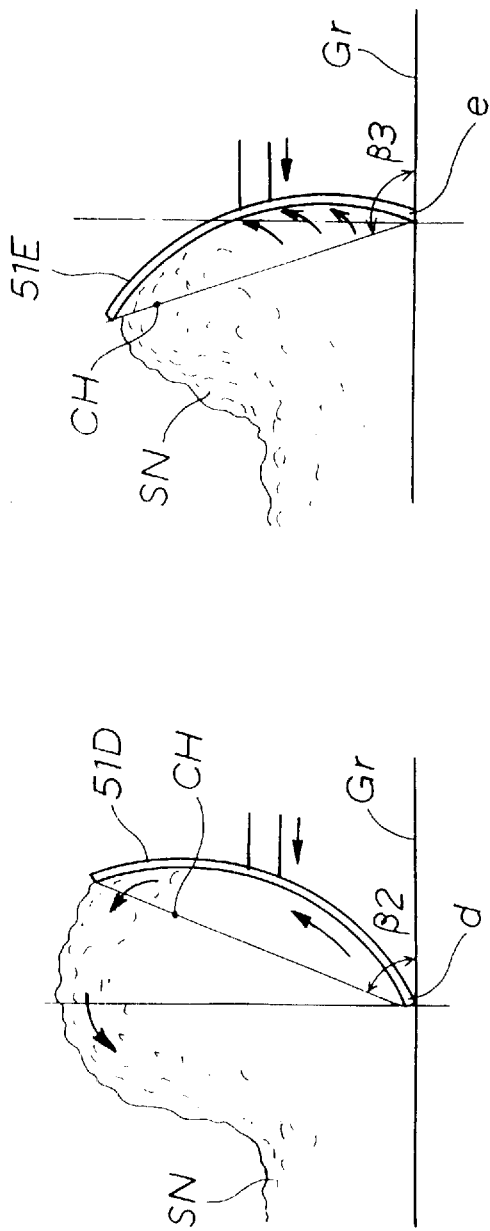

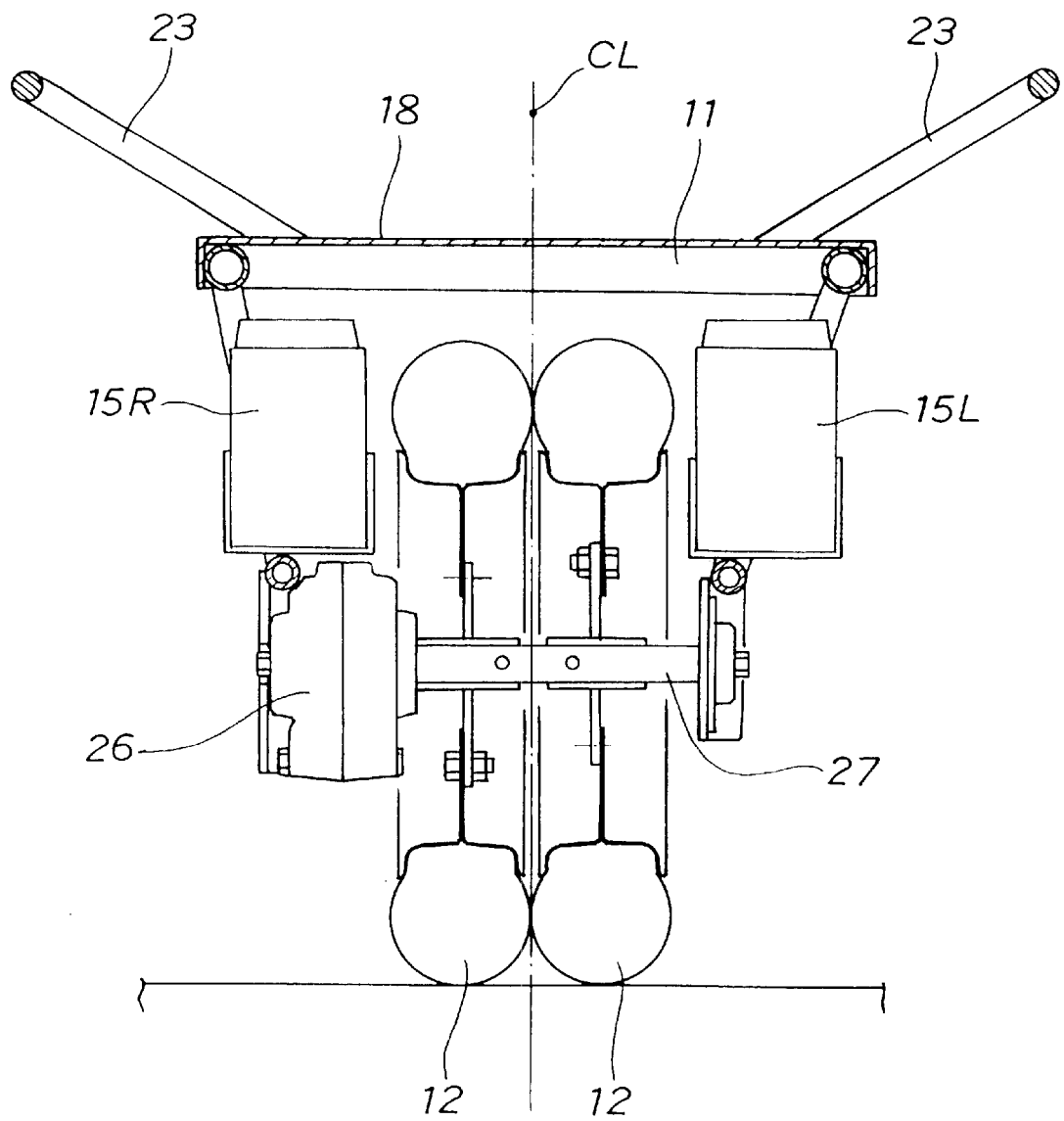

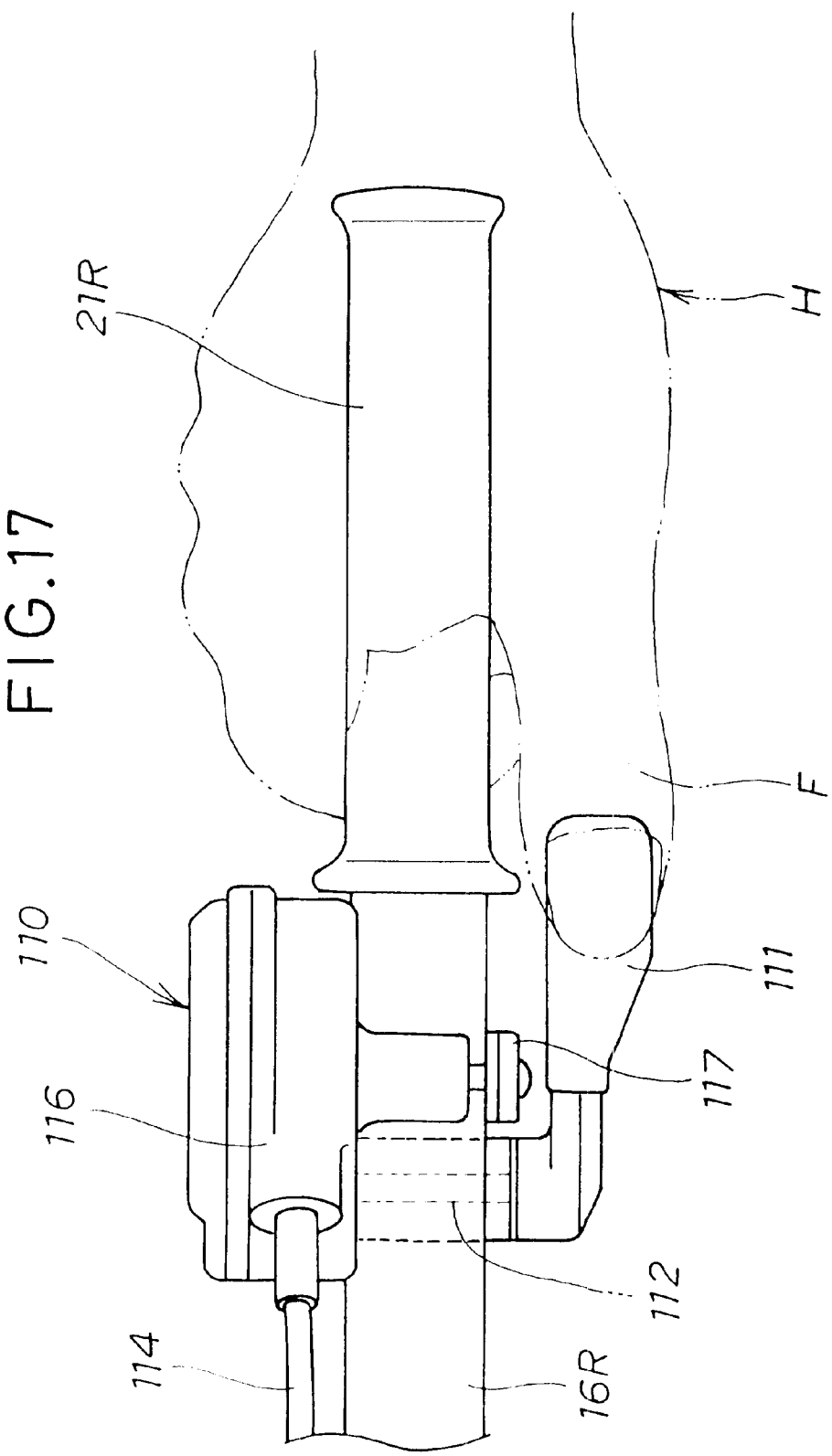

SNOW REMOVING VEHICLE

BACKGROUND OF THE INVENTION

1. Field of the Invention

The present invention relates to an improvement in a hand-pushed snow removing vehicle of small size.

2. Description of the Related Art

Conventionally, snow plowing tools and machines have been known from, for example, Japanese Utility Model Post-Exam Publication No. SHO-57-41075 and No. SHO-50-30171.

Japanese Utility Model Post-Exam Publication No. SHO-5741075 discloses a hand-pushed snow plowing tool simply designed such that an operator hand-pushes the tool with his hands holding operational handles.

In Japanese Utility Model Post-Exam Publication No. SHO-50-30171, there is disclosed a powered snow plowing machine which is self-propelled by a motive power source so as to reduce a burden of the operator.

The hand-pushed snow plowing tool includes a frame body, a snow-plowing blade provided at a front part of the frame body, and two wheels provided rightwardly and leftwardly of the frame body. The tool includes right and left operational handles extending obliquely and backwardly from a rear part of the frame body. Each operational handle has a grip at an end portion thereof.

The powered snow plowing machine includes a towing cart, a snow-plowing blade provided at a front part of the cart, two wheels provided rightwardly and leftwardly of the cart, and right and left operated handles extending backwardly from a rear part of the cart. The machine has an engine as a motive power source. Such an engine is operated to drive the wheels.

The tool is simple in construction and can thus be produced at a low cost. The machine is self-propelled by the operation of the engine to thereby reduce a burden of the operator.

However, each of the hand-pushed snow plowing tool and the powered snow plowing machine has two wheels provided rightwardly and leftwardly thereof in spaced relation to each other. As a result, the tool and the machine inevitably require large turning radiuses and can harldy make sharp turns. Consequently, both the tool and the machine provide poor mobility and operability.

SUMMARY OF THE INVENTION

It is therefore an object of the present invention to provide an easy-to-operate snow removing vehicle designed to reduce a burden of the operator and being capable of making a sharp turn when operated in a narrow workplace.

According to an aspect of the present invention, there is provided a hand-pushed snow removing vehicle comprising: a snow removing member provided at a front part of the vehicle so as to push snow; driving wheels provided in a widthwise central portion of the vehicle; a drive source provided in the vehicle so as to drive the driving wheels; right and left operational handles provided at a rear part of the vehicle in such a manner as to extend backwardly of the vehicle; and right and left grips provided at end parts of the right and left operational handles, respectively.

The vehicle of the present invention includes the driving wheels provided in the widthwise central portion thereof. Thus, the vehicle can make a sharp turn and provide improved mobility. Consequently, it becomes possible to facilitate removal of snow in a narrow workplace. Moreover, the driving wheels are driven by the drive source to thereby reduce a burden of operating the vehicle on the operator.

Preferably, the snow removing member has a width set not to exceed a distance between the right and left grips. Thus, the vehicle can be easily turned during a snow removing operation.

In a preferred form of the invention, the snow removing member is arc-shaped in vertical cross-section and disposed such that a chord of the arc lies substantially perpendicularly to a ground when a lower end portion of the snow removing member is set on the ground. With the thus-arranged snow removing member, removed snow moves along the arc having a small radius of curvature, whereby the removed snow does not reach the top of the snow removing member. Thus, a pushing force required to remove snow can be made small to thereby reduce a burden on the operator and the drive source. The chord is substantially perpendicular to the ground, and thereby the snow removing member can be easily attached to or detached from the front part of the vehicle.

In a further preferred form of the invention, the snow removing member includes an obliquely upwardly extending bottom sheet serving as a reinforcing rib, the bottom sheet being formed by bending the lower end portion backwardly. As a result, the snow removing member provides improved rigidity. Consequently, there is no need for providing a separate reinforcing member for serving as a reinforcing rib for the snow removing member. The bottom sheet, formed by bending the lower end portion backwardly, extends obliquely and upwardly. It is therefore unlikely that foreign materials get caught between the bottom sheet and the ground during the removal of snow.

Preferably, the hand-pushed snow removing vehicle is a single-wheeled electric vehicle having a single one of the driving wheel and an electric motor as the drive source. With only one drive wheel, it becomes possible to facilitate turning of the snow removing vehicle during a snow removing operation. That is, the vehicle can make a sharp turn and hence provide improved mobility. The electric motor used as the drive source produces a small sound when actuated and emits no exhaust gas. Thus, in an area in which residences are closely built, the removal of snow can be assumed even in early mornings or late at night without causing inconveniences to people living there.

Preferably, the vehicle further includes batteries for supplying an electric power to the electric motor. The batteries may be disposed between the snow removing member and an axle supporting the driving wheel. The front part of the vehicle becomes heavier to thereby press the driving wheel against the ground. Thus, the driving wheel is prevented from skidding on the ground, thereby enabling the vehicle to propel. With this arrangement, the operational handles for hand-pushing can be lifted up with a small force to thereby provide the vehicle with improved operability.

In a still preferred form of the invention, the right or left grip is a slidable grip which slides in correspondemce with a hand-pushing force produced by a hand. The vehicle further includes a detector, disposed proximately to the slidable grip, for detecting an amount of movement of the slidable grip to thereby control the electric motor. The operator can propel the vehicle by grasping and then pushing the grips with his hands. When the grip slides, the amount of movement of the grip is detected by the detector, whereupon the detector outputs a signal. Thereafter, the motor generates an assisting motive power in correspondence with the signal output from the detector, thereby assisting the operator in operating the vehicle. As explained above, the operator can propel the snow removing vehicle by grasping and then pushing the grips with his hands. Otherwise, the operator can propel the vehicle with the aid of the assisting motive power from the motor. For this reason, a further operation for adjusting the assisting motive power is not required.

Preferably, the right or left operational handle includes an operation-assist mechanism mounted thereon. The mechanism is designed such that it forcibly pushes the slidable grip towards the vehicle when an assist operation including grasping with a hand held onto the slidable grip is performed. By thus performing an assist operation with the hand held onto the grip, the grip is forcibly pushed towards the vehicle. The electric motor is actuated in correspondence with an amount of movement of the grip thus pushed, thereby assisting the operator in operating the vehicle. Therefore, since the operator can slide the grip without pushing the grip, he can easily obtain the assisting motive power during the removal of snow.

In a still further preferred form of the invention, the vehicle further includes stands at the rear part thereof. The vehicle is operated with the right and left operational handles lifted up such that the stands are lifted upwardly off the ground. The vehicle still further includes a control lever disposed in the proximity of the right or left grip, the control lever being operated with fingers or a thumb to control a voltage supplied to the electric motor. The control lever has improved operability, because the control lever can be operated with the fingers or thumb of the hand grasping the grip. Operation of the control lever causes the motor to be actuated to thereby drive the driving wheel.

In a still further preferred form of the invention, the vehicle further includes at an upper portion thereof a container for heaping up snow. By virtue of the container provided at the upper portion of the vehicle, the operator can heap snow on the container and then carry the snow to a desired place so as to dump the snow out of the container.

BRIEF DESCRIPTION OF THE DRAWINGS

A certain preferred embodiment of the present invention will hereinafter be described in detail, by way of example only, with reference to the accompanying drawings, in which:

FIG. 9 shows a electric circuit designed such that an electric motor supplies an assisting motive power to the snow shoveling machine shown in FIG. 1;

FIGS. 12A through 12E show how the snow removing member of the present invention and other possible snow removing members remove snow;

FIG. 13 shows, partially in cross-section, a modified snow shoveling machine obtained by modifying the machine of FIG. 1 such that two driving wheels are provided in a widthwise central portion thereof;

FIG. 17 is a plan view showing, on an enlarged scale, a control lever mechanism shown in FIG. 16A;

DETAILED DESCRIPTION OF THE PREFERRED EMBODIMENT

The following description is merely exemplary in nature and is in no way intended to limit the invention, its application or uses.

Figure 1:
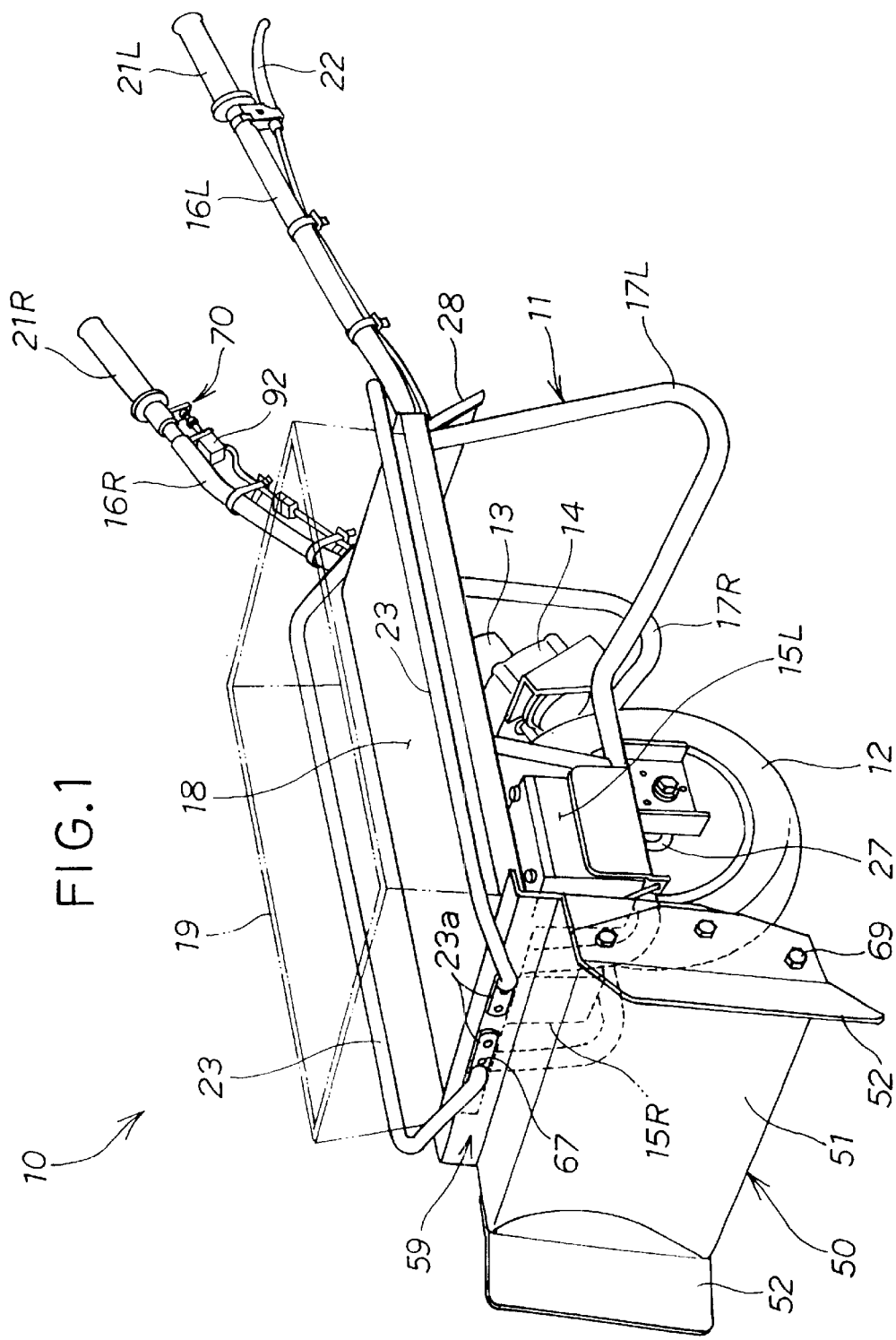
FIG. 1 is a perspective view of a snow shoveling machine comprising an electric single-wheel vehicle according to the present invention.

Referring to FIG. 1, there is shown a snow shoveling machine 10. The snow shoveling machine 10 includes a vehicle body frame 11, a wheel 12 mounted at a widthwise central portion of the frame 11, and an electric motor 13 serving as a drive source for the wheel 12. That is, the machine 10 comprises an electric single-wheel vehicle having a snow removing member 50 mounted thereto. Batteries 15R, 15L serving as power supplies for the motor 13 are provided rightwardly and leftwardly of the frame 11, respectively. Attached to the frame 11 is a motive power transmission mechanism 14 for transmitting a rotational output from the motor 13 to the wheel 12. On the frame 11, there is mounted right and left operational handles 16R, 16L which are upwardly inclined and extend backwardly from a rear part of the frame 11. Provided below the rear part of the frame 11 are right and left stands 17R, 17L to be placed on the ground. At an upper part of the frame 11, there is provided a carrier 18. A container 19 for heaping up snow is detachably mounted at the upper part of the frame 11 or on the carrier 18, as shown by a phantom line. The snow removing member 50 is removably attached to a front part of the vehicle body frame 11. The snow shoveling machine 10 is a hand-pushed snow removing vehicle comprising an electric single-wheel vehicle designed such that the motor 13 generates an assisting motive power in correspondence to an operating force produced by an operator so as to assist the operator in operating the machine 10.

The right and left operational handles 16R, 16L include right and left grips 21R, 21L mounted on end portions thereof. The left operational handle 16L has a brake lever 22. The right handle 16R includes an operation mechanism 70 for controlling whether the motor 13 is actuated. Reference numerals 23, 23 denote bars for surrounding the carrier 18.

Figure 2:
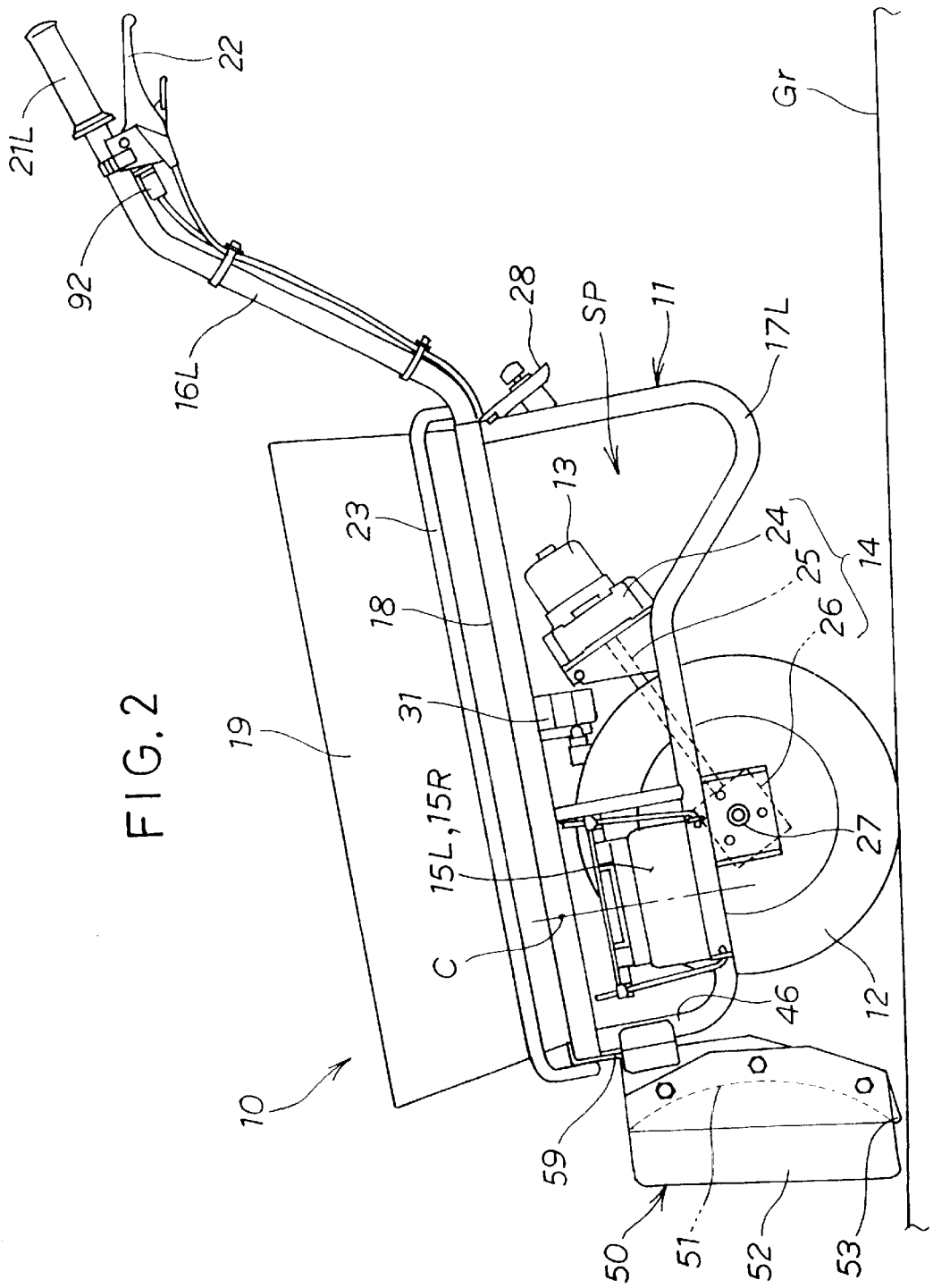
FIG. 2 is a side elevation view of the snow shoveling machine shown in FIG. 1.

Turning to FIG. 2, there is shown the vehicle body frame 11 having the front part thereof inclined downwardly such that the snow removing member 50 has a lower end portion 53 close to the ground Gr. The motive power transmission mechanism 14 includes a first reducing mechanism 24, a transmission shaft 25, and a second reducing mechanism 26. The first and second reducing mechanisms 25, 26 and the transmission shaft 25 cooperate with each other to transmit a motive power from the electric motor 13 to the wheel 12 through an axle 27. The first reducing mechanism 24 incorporates a one-way clutch (not shown) for transmitting the motive power only in one direction from the motor 13 to the axle 27.

The right and left batteries 15R, 15L are positioned between the axle 27 and the snow removing member 50. More specifically, as the machine 10 is viewed in side elevation, the batteries 15R, 15L are disposed within a space SP defined by the frame 11. The frame 11 is comprised of a pipe frame. Centers C of the batteries 15R, 15L are positioned forwardly of the axle 27. The motor 13 is disposed in the space SP and is positioned rearwardly and upwardly of the axle 27. More specifically, centers of gravity of the batteries 15R, 15L serving as weights are positioned forwardly of the axle 27 while a center of gravity of an assembly formed by the motor 13 and the first reducing mechanism 24 serving as weights is positioned rearwardly of the axle 27. Reference numeral 31 designates a controlling device provided within the space SP.

With the batteries 15R, 15L thus positioned between the axle 27 and the snow removing member 50, a front portion of the machine 10 is heavier. A pressure required to press the wheel 12 against the ground is thus increased. Therefore, it becomes possible to prevent the wheel 12 from skidding on the ground to thereby ensure that the wheel 12 is driven by the motor 13 to propel the machine 10. Further, by providing the batteries 15R, 15L positioned between the axle 27 and the snow removing member 50, the weights of the front and rear portions of the machine 10 can be set such that the machine 10 has its improved operability so as to efficiently remove snow. With the weights thus set, a lifting force required for the operator to lift up the operational handles 16R, 16L can be made small while an operating force required to operate the handles 16R, 16L is also made small. Since the lifting force and the operating force are small, the machine 10 is easy to operate or turn.

Figure 3:
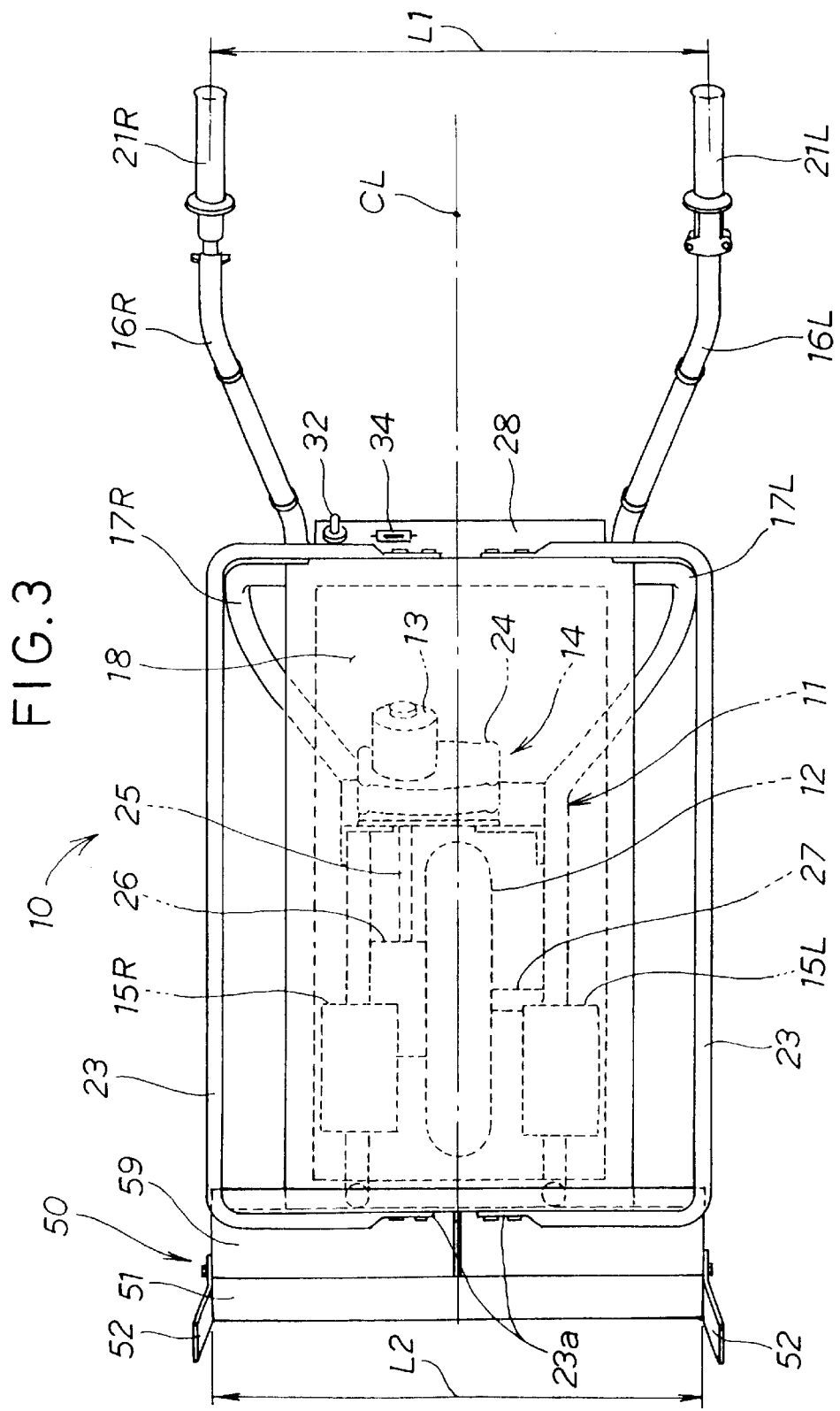
FIG. 3 is a top plan view of the snow shoveling machine shown in FIG. 1.

Reference is made to FIG. 3. The wheel 12 is disposed in a widthwise center CL of the frame 11 (widthwise center of the machine 10). The two batteries 15R, 15L are positioned rightwardly and leftwardly of the frame 11, respectively. The machine 10 has the motor 13 disposed rightwardly of the widthwise center CL as viewed in a direction of movement thereof.

The vehicle body frame 11 includes a mounting plate 28 attached to the rear part thereof. In the mounting plate 28, there are mounted a key switch 28 and a battery residual quantity indicator 34.

A width of the snow removing member 50, namely, a width L2 of a snow removing portion 51 is set not to exceed a distance L1 between the right and left grips 21R, 21L. By thus setting the width L2 and the distance L1, it becomes possible to facilitate turning the machine 10 during the removal of snow. When the width L2 of the snow removing portion 51 is too small, an amount of snow pushed by the snow removing portion 51 is also small. Thus, snow can not be efficiently removed by the machine 10. When the width L2 of the snow removing portion 51 is too large, the amount of snow pushed by the snow removing portion 51 is also large. However, the machine 10 can not be easily turned. Therefore, it is preferable that the width L2 of the snow removing portion 51 is set to be substantially equal to or slightly smaller than the distance L1 between the right and left grips 21R, 21L.

Figure 4:
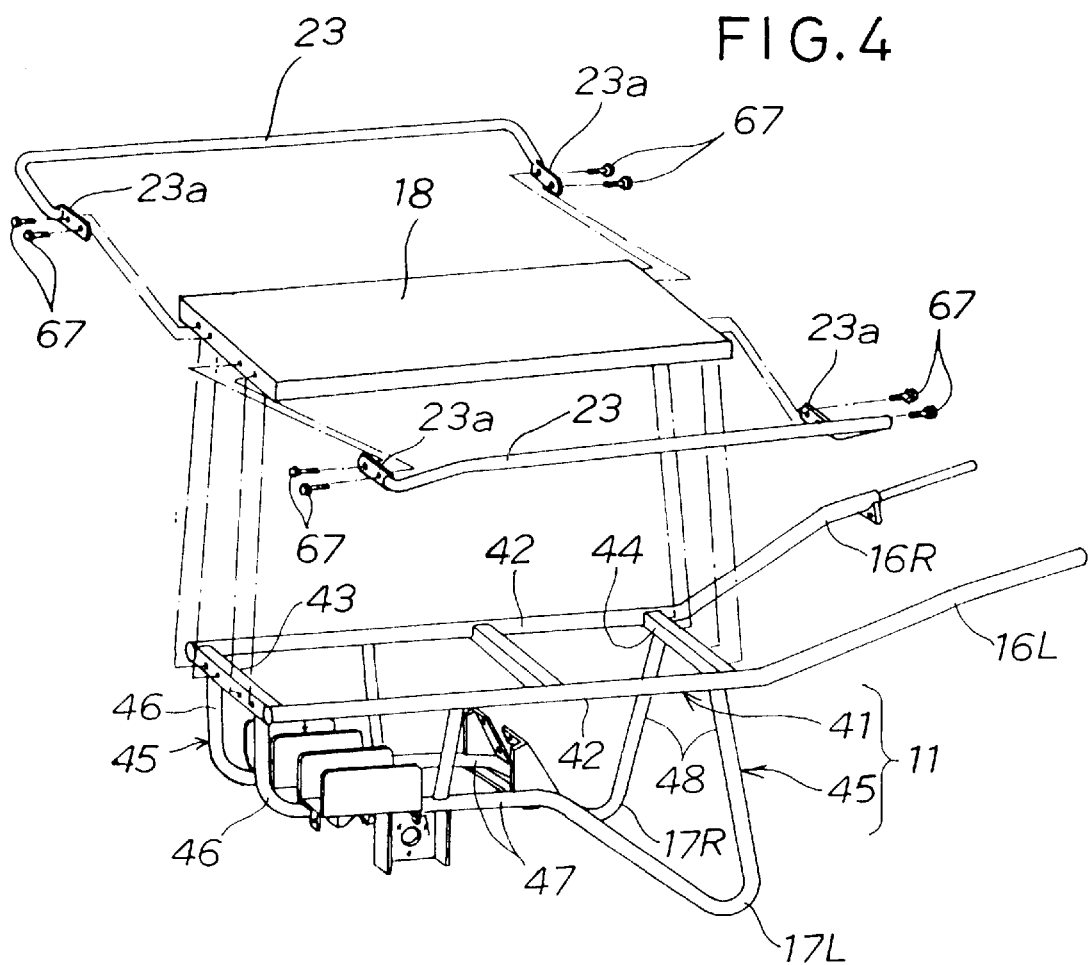
FIG. 4 is an exploded perspective view of a vehicle body frame, a carrier, and bars for the carrier, all of which form the snow shoveling machine in FIG. 1.

FIG. 4 is an exploded perspective view of the vehicle body frame, the carrier, and the bars for the carrier which form the snow shoveling machine.

As shown in FIG. 4, the vehicle body frame 11 includes an upper frame 41 formed to have a rectangular configuration as viewed in top plan, and right and left horizontal frames 45, 45 both formed to have substantially U-shaped configurations as viewed in side elevation. The frames 45, 45 are comprised of round pipes. The frame 11 is comprised of a pipe frame.

The upper frame 41 comprises right and left side members 42, 42 extending longitudinally of the machine 10, a front cross member 43 laid between front ends of the side members 42, 42, and a rear cross members 44 laid between rear ends of the side members 42, 42. The members 42, 42 are comprised of round pipes. Both of the cross members 43, 44 are comprised of squarish pipes.

As the left horizontal frame 45 is viewed in side elevation, the frame 45 includes a front vertical portion 46 provided at a front end thereof, a horizontal portion 47 extending horizontally backwardly from a lower end portion of the front vertical portion 46, and the stand 17L provided below a rear end portion of the horizontal portion 47 and bent to have a substantially V-shaped configuration. The stand 17L includes a rear erecting portion 48. The right horizontal frame 45 has the same construction as the left horizontal frame 45.

The carrier 18 covers the upper frame 41. The carrier 18 is attached to the cross members 43, 44 through mounting brackets 23a, 23a of the bars 23, 23 by means of bolts 67.

Figure 5:
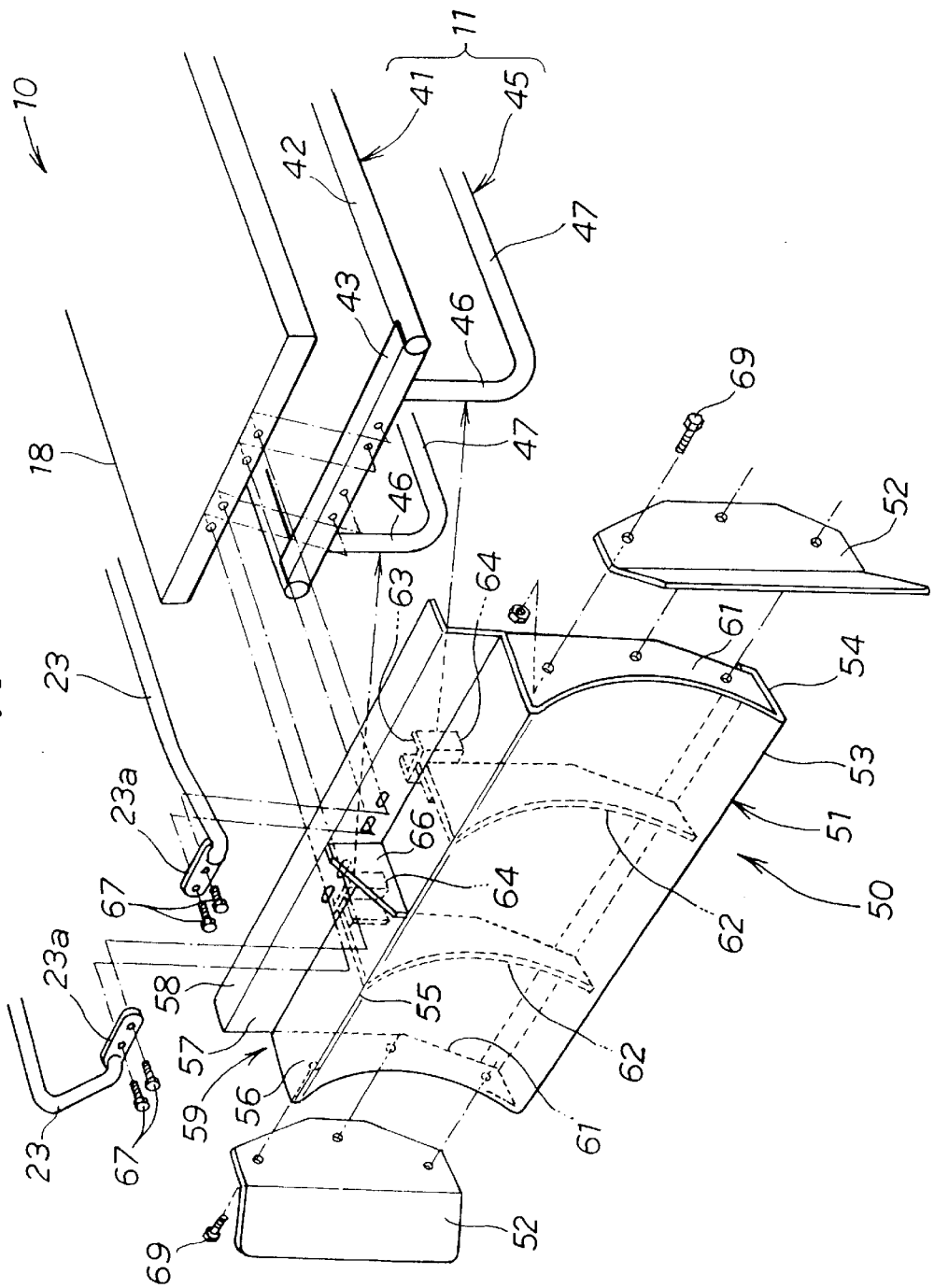
FIG. 5 is an exploded perspective view showing in detail the vehicle body frame and a snow removing member forming the snow shoveling machine in FIG. 1.
Figure 6:
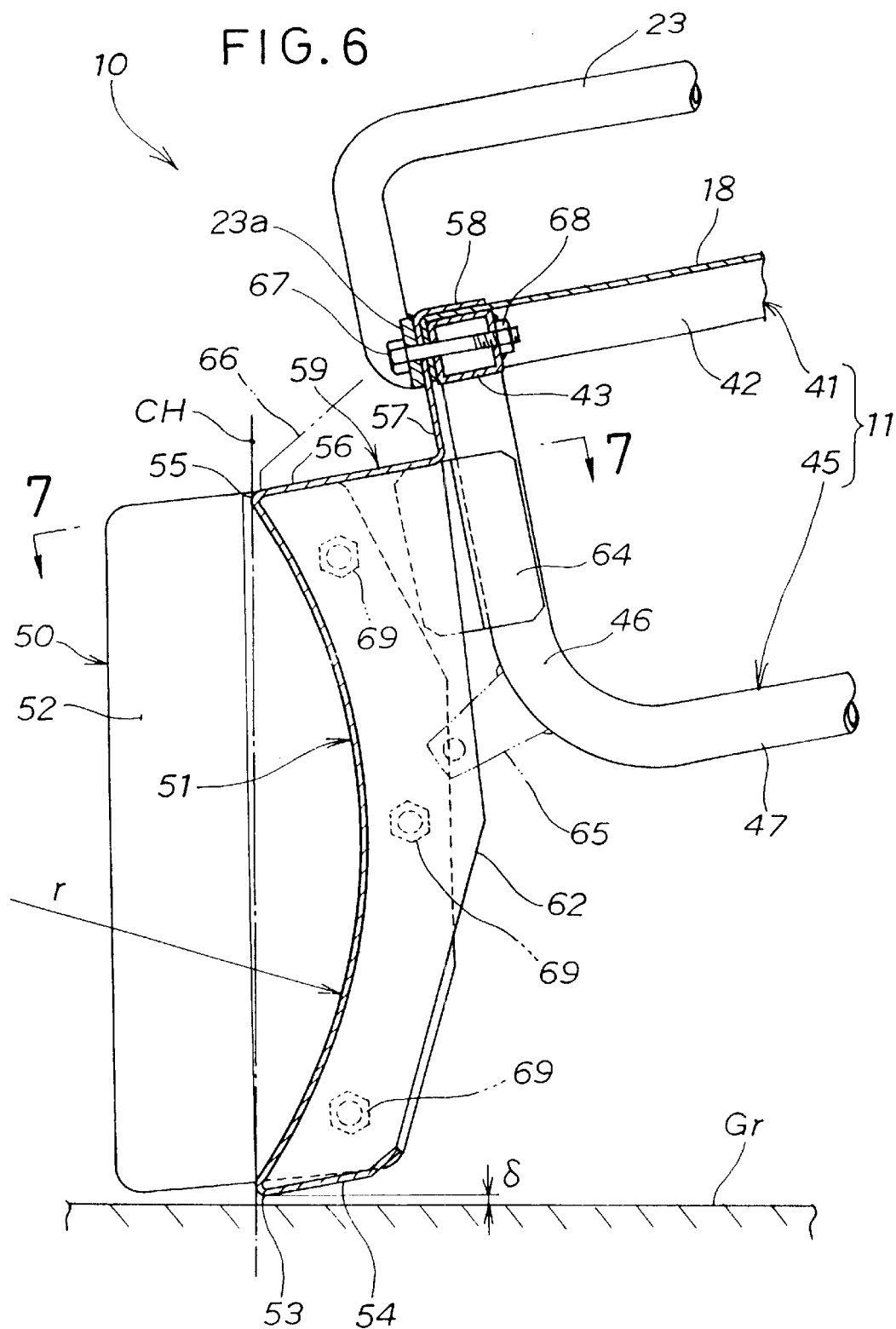
FIG. 6 is a side view showing the snow removing member in cross-section.
Figure 7:
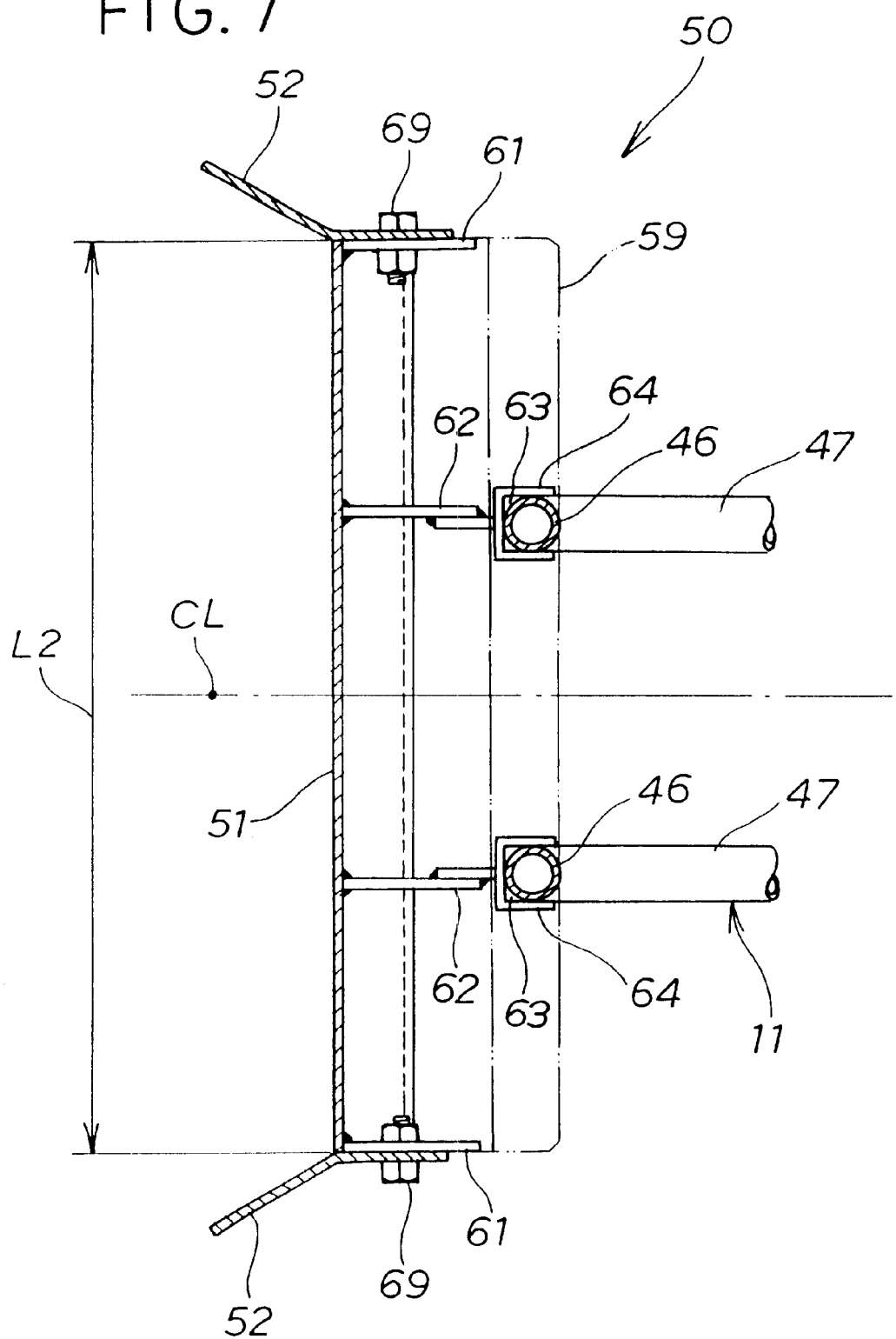
FIG. 7 is a cross-sectional view taken along line 7—7 of FIG. 6.

Reference is made to FIGS. 5 to 7 showing relation between the vehicle body frame 11 and the snow removing member 50.

As shown in FIG. 6, the front part of the vehicle body frame 11 is inclined downwardly in such a manner as to have the lower end portion 53 of the snow removing member 50 close to the ground Gr.

With reference to FIGS. 5 and 6, the member 50 includes the snow removing portion 51 for pushing snow, and guide sheets 52, 52 provided rightwardly and leftwardly of the snow removing portion 51 so as to guide snow to the snow removing portion 51.

The snow removing portion 51 of the member 50 has an arc-shaped vertical cross-section curved concavely backwardly thereof. When the snow removing portion 51 has the lower end portion 53 close to the ground Gr as shown in FIG. 6, a chord CH extending through the lower end portion 53 and an upper end 55 of the snow removing portion 51 is substantially perpendicular to the ground Gr. As used herein, the term "the lower end portion 53 close to the ground Gr" means that the lower end portion 53 is close to the ground Gr with a small gap δ provided therebetween, or the lower end portion 53 is in abutment on the ground Gr.

More specifically, the snow removing portion 51 is formed by bending a sheet article in such a manner as to have an arc-shaped cross-section of given radius of curvature r. A horizontal sheet 56 extends backwardly from the upper end 55 of the snow removing portion 51. The horizontal sheet 56 includes a vertical sheet 57 extends upwardly from a rear end thereof. A sheet 58 to be carried on the carrier 18 extends backwardly from an upper end of the vertical sheet 57.

With both the sheet 58 and the vertical sheet 57 on the carrier 18, the vertical sheet 57 is fasten to the cross member 43 by means of the mounting brackets 23a of the bar 23, the bolt 67, and a nut 68 so as to attach the snow removing member 50 to the frame 11. The horizontal sheet 56, the vertical sheet 57, and the sheet 58 cooperate with each other to form a mounting portion 59 provided for attaching the snow removing member 50 to the frame 11.

The snow removing portion 51 has an obliquely upwardly extending bottom sheet 54. The bottom sheet 54 is formed by bending the lower end portion 53 of the snow removing portion 51 backwardly. The bottom sheet 54 serves as a reinforcing rib. The bottom sheet 54 extends along the width of the snow removing portion 51. By bending a sheet article, there is formed the aforementioned snow removing portion 51 including the bottom sheet 54, the horizontal sheet 56, the vertical sheet 57, and the sheet 58, all of which are integral with each other. Such a snow removing member 50, more specifically, the snow removing portion 51 has an increased rigidity because the bottom sheet 54 serves as the reinforcing rib. Since the bottom sheet 54 extends backwardly and is inclined upwardly, it becomes possible to prevent foreign materials from being caught between the bottom sheet 54 and the ground Gr during the removal of snow.

Referring to FIG. 7, the snow removing portion 51 includes right and left side ribs 61, 61 joined to back surfaces of the right and left end portions of thereof, and right and left intermediate ribs 62, 62 joined to back surfaces of an intermediate portion thereof. These ribs 61, 61, 62, 62 are sheet articles extending longitudinally of the machine 10.

The right and left guide sheets 52, 52 are respectively secured to outside surfaces of the right and left side ribs 61, 61 through bolts 69, 69. The right and left guide sheets 52, 52 extend forwardly and outwardly so as to easily collect snow on the snow removing portion 51.

The right and left intermediate ribs 62, 62 have right and left stays 64, 64 joined to rear ends thereof. The stays 64, 64 include recessed portions 63, 63. The front vertical portions 46, 46 of the frame 11 are fitted into the recessed portions 63, 63. The stays 64, 64 are supported by the front vertical portions 46, 46 such that the vehicle body frame 11 can withstand a force acting on the snow removing portion 51 of the snow removing member 50.

Turning back to FIG. 6, a supporting member 65 may be provided to the snow removing member 50 in addition to the stays 64, 64, as shown by a phantom line. In this case, the snow removing member 50 may be bolted to the frame 11 through the supporting member 65. Designated by reference numeral 66 is a rib.

Figure 8:
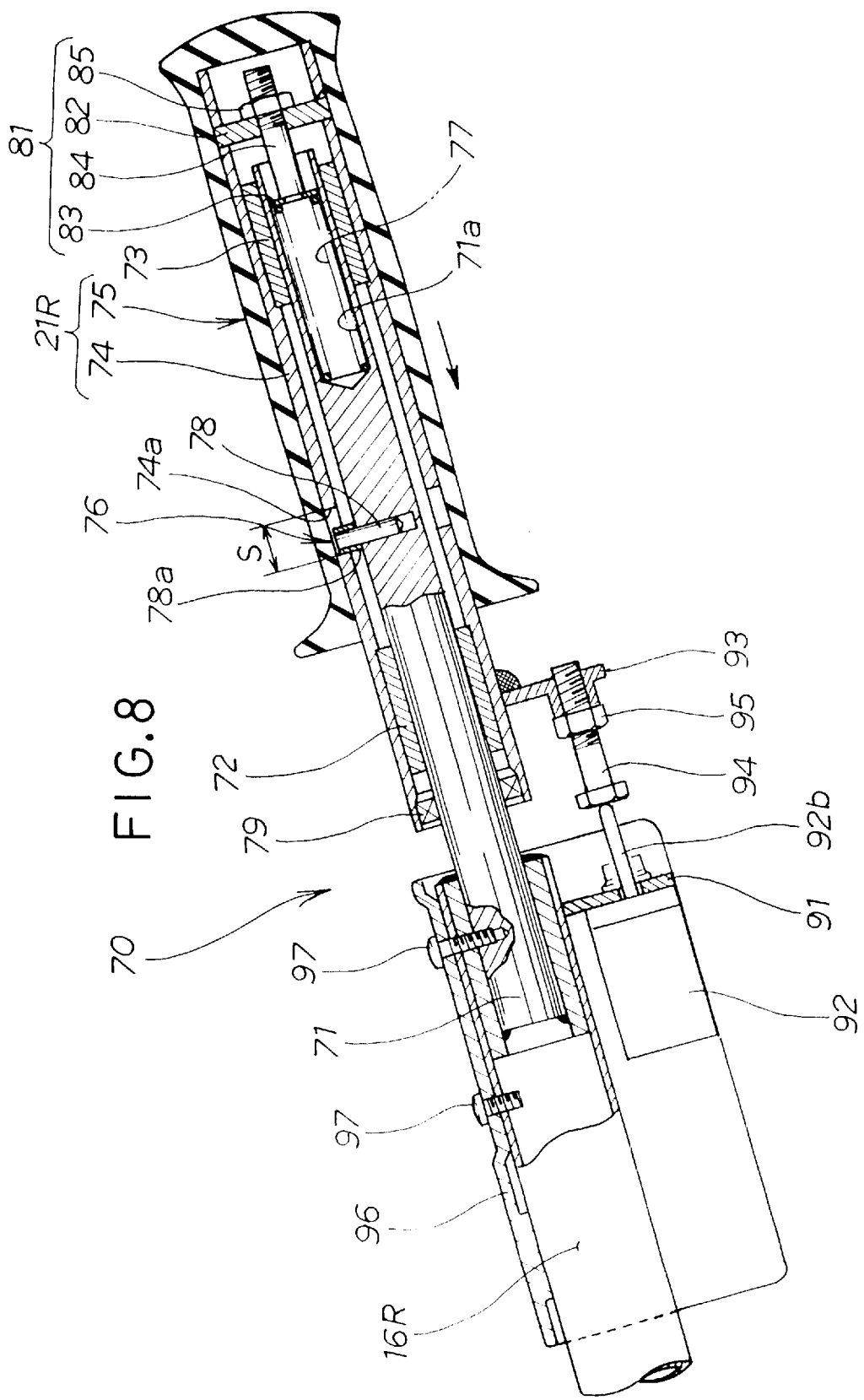
FIG. 8 is a side view showing, in cross-section, an operation mechanism and a slidable grip mounted on a right operational handle.

Reference is made to FIG. 8 illustrating constructions of and relation between the operation mechanism 70 and the right grip 21R provided to the right operational handles 16R.

The right operational handle 16R is comprised of a pipe material. The handle 16R includes a round bar 71 attached to an end portion thereof. The grip 21R has a sliding portion 74 formed from a pipe material, and a grip portion 75 made of rubber. The bar 71 is inserted into the sliding portion 74 such that the sliding portion 74 slides thereon. The grip 21R covers the sliding portion 74. Two bushes 72, 73 are provided forwardly and backwardly of the sliding portion 74 and fitted into the sliding portion 74. The bar 71 extends through the bushes 72, 73.

The operation mechanism 70 includes a stopper mechanism 76, a resilient member 77, an adjustment mechanism 81, and a detector 92 for detecting the amount of movement of the grip 21R.

The stopper mechanism 76 is provided between the bar 71 and the sliding portion 74. The stopper mechanism 76 has a pin 78 fixedly mounted to the bar 71, and a long aperture 74a formed in the sliding portion 74 and extending axially of the sliding portion 74. The pin 78 thus secured to the bar 71 is fitted into the long aperture 74a and is perpendicular to an axial line extending longitudinally of the bar 71. The long aperture 74a is designed such that the sliding portion 74 is shifted a predetermined amount of movement S. The long aperture 74a and the pin 78 provide the stopper mechanism 76 in combination with each other. With the stopper mechanism 76 thus simply constructed, the amount of movement of the grip 21R can be regulated. Additionally, the grip 21R is prevented from rotating on the bar 71. It is preferable that the pin 78 includes a bumper member 78a at a portion thereof abutting on a wall forming the long aperture 74a, as required. The bumper member 78a is made of resilient material such as rubber.

The resilient member 77 usually urges the grip 21R in such a manner as to push the grip 21R backwardly (rightwardly of this figure). The resilient member 77 comprises a compression spring received in an aperture 71a formed in a rear end of the bar 71.

The adjustment mechanism 81 comprises a bolt mounting sheet 82 mounted at a rear end portion of the sliding portion 74, an adjustment bolt 84 which is screwed into an opening formed in the bolt mounting sheet 82 in such a manner as to press the resilient member 77 by means of a plain washer 83, and a lock nut 85 for the bolt 84. The bolt 84 is also screwed into the lock nut 85. The lock nut 85 is provided for adjusting a repelling force generated by the resilient member 77.

The sliding portion 74 has its front end portion secured to an arm 93 formed from a sheet article. Screwed into the arm 93 is a pushing bolt 94 extending in parallel to the bar 71. The bolt 94 is locked by the arm 93 through a lock nut 95.

The detector 92 is mounted to the end portion of the operational handle 16R by means of a bracket 91 provided on the operational handle 16R. The detector 92 detects the amount of movement of the grip 21R when the grip 21R is shifted towards the operational handle 16R to thereby push a push rod 92b provided on the detector 92. The detector 92 then converts the detected amount of movement into an electric signal. The detector 92 is formed by, for example, a potentiometer 92a, as shown in FIG. 9. The push rod 92b of the detector 92 extends in parallel to the bar 71. The push rod 92b includes an end portion thereof contacting an end portion of the pushing bolt 94. The rod 92b is pushed by the pushing bolt 94. The detector 92 is covered with a cover 96 for the detector 92. The cover 96 is mounted to the operational handle 16R through screws 97, 97. Reference numeral 79 denotes a packing provided between the bar 71 and the sliding portion 74 to prevent water from flowing into a space therebetween.

Discussion will be made next as to operation of the thus arranged operation mechanism 70 with reference to FIG. 8.

By grasping the grip 21R and then pushing the same towards the handle 16R (leftwardly of this figure), a pushing force is generated. Such a pushing force is applied to the resilient member 77 through the sliding portion 74, the bolt mounting sheet 82, the adjustment bolt 84, and the plain washer 83. Then, the grip 21R is slid towards the handle 16R against the repelling force produced by the resilient member 77, whereupon the pushing bolt 94 is slid by the same amount of movement as the grip 21R to thereby push the push rod 92b of the detector 92. The detector 92 outputs an electric signal corresponding to the amount of movement of the push rod 92b.

When the grip 21R is freed from the pushing force, the grip 21R is automatically returned to its original position, as shown in FIG. 8, by the repelling force generated by the resilient member 77. Thus, the electric signal output from the detector becomes zero.

Shown in FIG. 9 is an electric circuit for the snow shoveling machine of the present invention. The circuit as shown in FIG. 9 is designed such that the electric motor 13 is controlled by the operation mechanism 70.

The electric circuit for the machine comprises the controlling device 31, the batteries 15R, 15L, the key switch 32 serving as a main switch and connected between the batteries 15R, 15L and the controlling device 31, the detector 92 of the operation mechanism 70, the electric motor 13, a vehicle velocity detecting portion 33 for detecting a rotational speed of the motor 13, and the battery residual quantity indicator 34 for indicating residual power in the batteries 15R, 15L. All the key switch 32, the detector 92, the electric motor 13, the vehicle velocity detecting portion 33, and the indicator 34 are connected to the controlling device 31.

The controlling device 31 serves such a function of controlling the motor 13 as controlling a voltage supplied to the motor 13 in correspondence to the electric signal output from the detector 92 when the level of the electric signal output from the detector 92 is higher than a predetermined level.

Figure 10A:
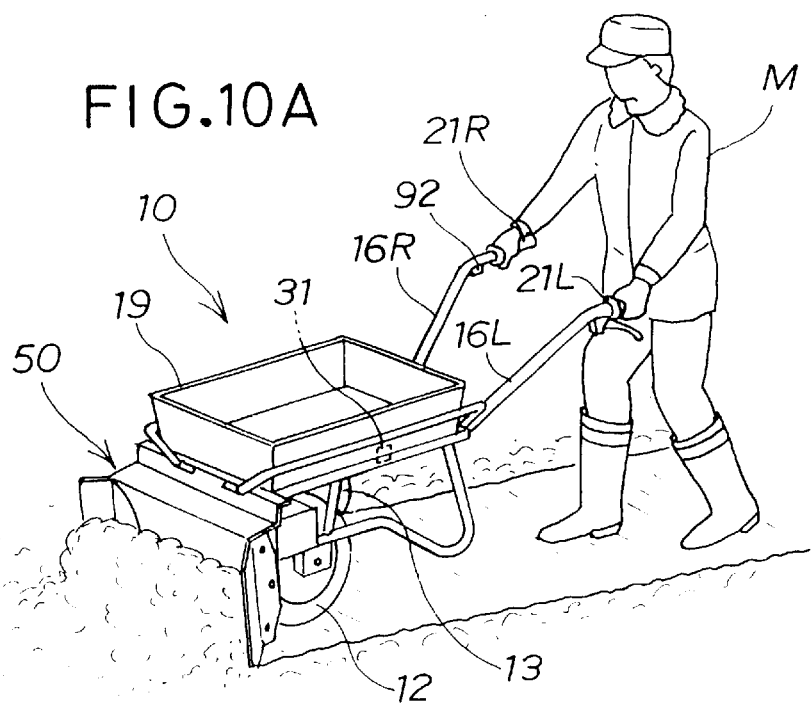
FIGS. 10A, 10B, and 10C show how the snow shoveling machine shown in FIG. 1 is used.
Figure 10B:
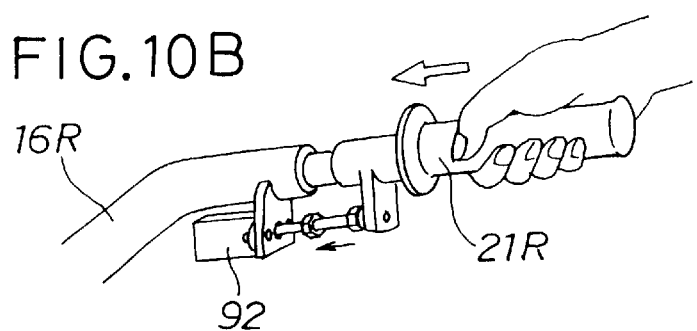
Figure 10C:
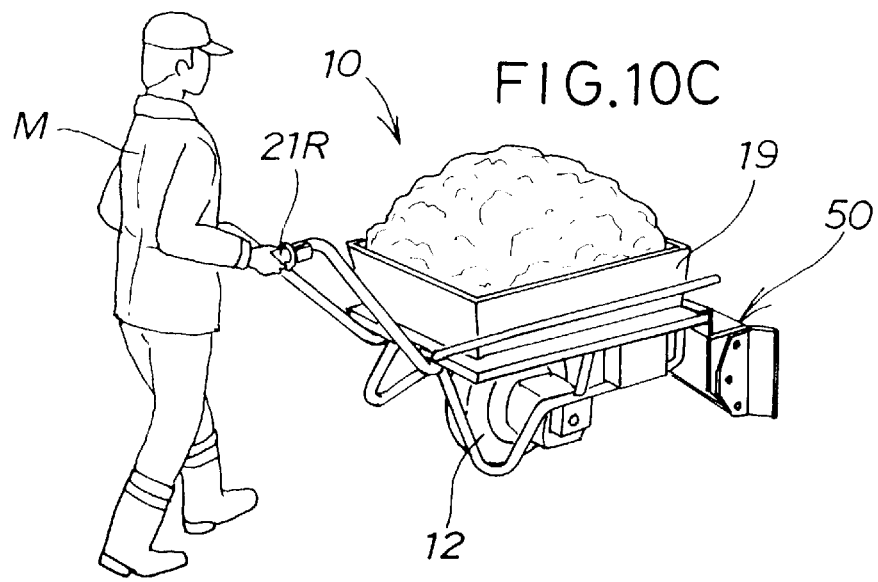

Turning to FIGS. 10A to 10C, snow is removed using the snow shoveling machine of the present invention.

As shown in FIG. 10A, the snow shoveling machine 10 is propelled by an operator M so as to remove snow. Removal of snow is effected by pushing snow forwardly with the snow removing member 50. When the pushing force generated by grasping and then pushing the grips 21R, 21L with hands is small, the amount of movement of the grip 21R is also small. The detector 92 as shown in FIG. 10B thus outputs an electric signal having a low level. The level of such an electric signal is not higher than the predetermined level, and therefore the device 31 as shown in FIG. 9 does not supply to the motor 13 a control signal for controlling the motor 13. This means that when the pushing force is smaller than a reference pushing force that causes the motor 13 to generate the assisting motive power, the device 31 does not generate the control signal and thus the motor 13 does not generate the assisting motive power, either. In such a case, the snow shoveling machine 10 is traveled by such a small pushing force produced by the operator M alone. As the snow shoveling machine 10 is traveled by the small pushing force, rotation of the wheel 12 is not transmitted to the motor 13 because the first reducing mechanism 24 as shown in FIG. 2 incorporates the one-way clutch (not shown).

When the pushing force produced by grasping and then pushing the grips 21R, 21L with the hands is larger than the reference pushing force, the amount of movement of the grip 21R in FIG. 10B is provided which corresponds to the pushing force thus produced. Then, the detector 92 outputs the electric signal in correspondence to such an amount of movement of the grip 21R. On the basis of the electric signal output from the detector 92 in the manner as stated above, the device 31 as shown in FIG. 9 supplies the control signal to the motor 13. The electric signal output from the detector 92 varies in correspondence to the pushing force produced by pushing the grip 21R. The motor 13 is controlled by the device 31 in such a manner as to output the assisting motive power corresponding to the control signal supplied from the device 31. By thus pushing the grip 21R with the pushing force larger than the reference pushing force, the motor 13 is operated to produce the assisting motive power for assisting the operator M in operating the machine 10.

Referring to FIG. 10C, snow is heaped up in the container 19. The operator M carries the snow to the desired place at which the snow is dumped out of the container. It will be appreciated that whether the operator M propels the machine 10 with or without the aid of the assisting motive power from the motor 13 depends upon the magnitude of the pushing force produced by grasping and then pushing the grip 21R in the manner as described with reference to FIG. 10A.

The operator M pushes the machine 10 with his hands grasping the grips 21R, 21L, regardless of whether the operator M propels the machine 10 with or without the aid of the assisting motive power.

Figure 11A:
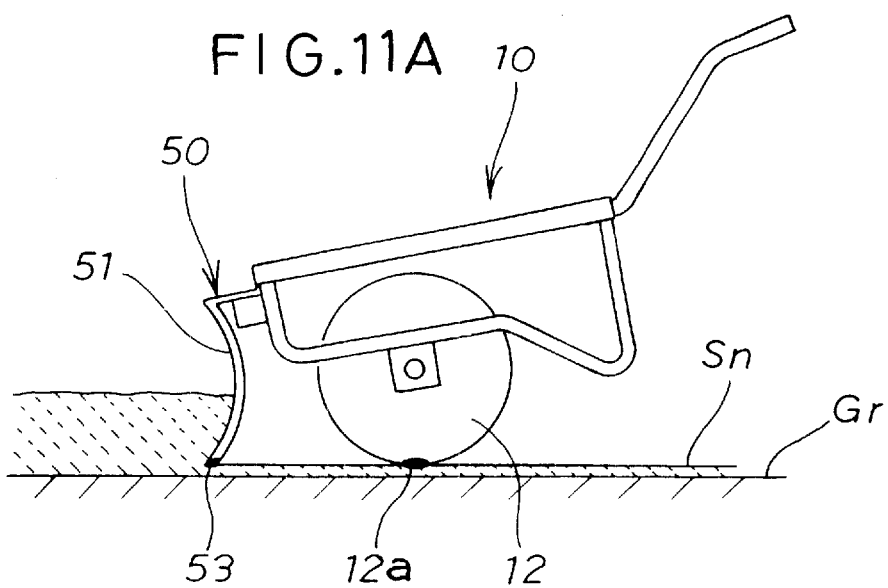
FIGS. 11A, 11B, and 11C show relation between a snow removing member and a driving wheel on the ground as the snow shoveling machine of FIG. 1 is used.
Figure 11B:
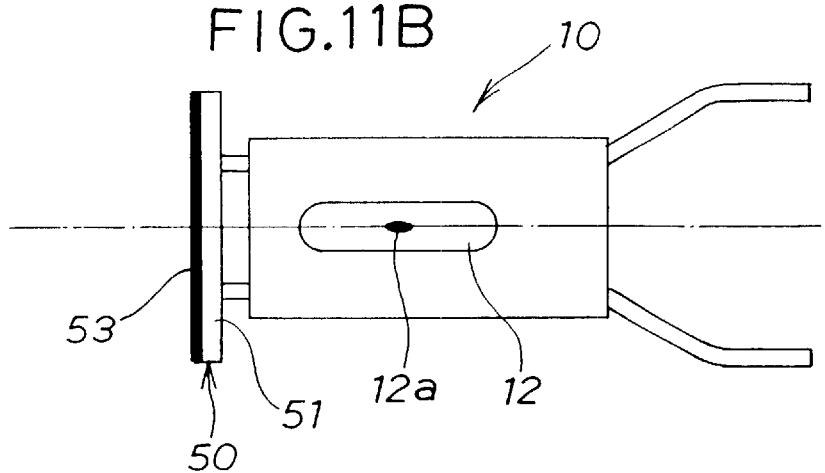
Figure 11C:
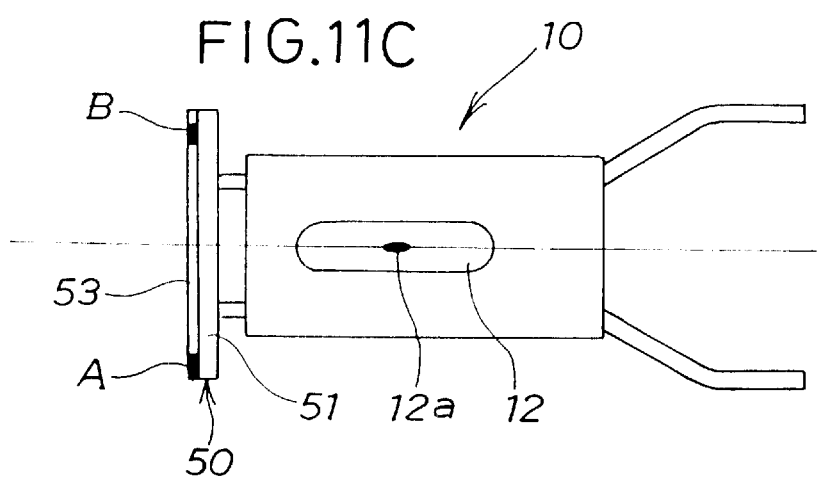

FIGS. 11A to 11C illustrate how the snow shoveling machine 10 is operated to remove snow.

With reference to FIG. 11A, the machine 10 is propelled to remove snow. Removal of snow is effected by pushing snow forwardly with the snow removing member 50. During the removal of snow, the lower end portion 53 of the snow removing portion 51 pierces accumulated snow. The wheel 12 positioned in the widthwise central portion of the machine has a lower end portion 12a thereof contacting the ground Gr or a surface Sn of unremoved snow. Whether the lower end portion 53 contacts snow throughout the width thereof as shown in FIG. 11B, or has at least two points A, B contacting the snow as shown in FIG. 11C depends upon the extent to which the lower end portion 53 pierces the snow.

Therefore, as snow is removed by the snow shoveling machine 10, at least three supporting points including the lower end portion 12a of the wheel 12, and the points A, B of the snow removing portion 51 contact the ground Gr or the surface Sn, as viewed in plan. By thus providing at least the three supporting points, the machine 10 can be traveled stably. The thus constructed snow shoveling machine 10 can steadily remove snow.

FIGS. 12A to 12E illustrate how the snow removing portion 51 of the present invention, and other possible snow removing portions are operated upon the removal of snow.

Shown in FIG. 12A is the snow removing portion 51 of the present invention. The snow removing portion 51 has an arced cross-section. The snow removing portion 51 is disposed such that the chord CH extends substantially perpendicularly to the ground Gr when the lower end portion 53 is placed on the ground Gr. Snow SN is pushed forwardly by the snow removing portion 51 while moving upwardly along the arced cross-section of the snow removing portion 51 and falling. The snow SN moves along an arc having a small radius of curvature, such that the snow SN does not reach the top of the snow removing portion. Therefore, the snow SN can be removed with an optimal pushing force. Since the chord CH extend perpendicularly to the ground Gr, the snow removing portion 51 can be easily mounted to the vehicle frame 11.

Referring to FIG. 12B, there is shown a first snow removing portion 51B to be compared with the snow removing portion 51. The snow removing portion 51B is formed by a sheet article substantially perpendicularly disposed on the ground Gr. The snow removing portion 51B compresses snow SN placed at the front thereof. As a result, a very large force is undesirably required to push the snow SN.

Turning to FIG. 12C, there is shown a second snow removing portion 51C to be compared with the snow removing portion 51. The snow removing portion 51C is formed by a sheet article inclined backwardly at a given angle β1 (an acute angle) to the ground Gr. The top of the snow removing portion 51C is covered with snow SN. The snow SN is likely to fall from the top of the snow removing portion 51C to the ground Gr. Therefore, the snow SN can not be efficiently removed. Further, the snow removing portion 51C increases in weight because of the snow SN on the top thereof, whereby a large force is undesirably required to push the snow removing portion 51C.

FIG. 12D illustrates a third snow removing portion 51D to be compared with the snow removing portion 51. The snow removing portion 51D has an arc-shaped cross-section. The snow removing portion 51D is inclined backwardly with a lower end portion d thereof on the ground Gr, such that a given angle β2 (obtuse angle) is provided between the ground Gr and a chord CH extending between the lower end portion d and an upper end portion of the snow removing portion 51D. Snow SN is pushed forwardly by the snow removing portion while moving upwardly along the arced cross-section of the snow removing portion 51D and falling. Since the snow removing portion 51D is inclined backwardly, the uppermost portion of the snow SN is higher than the upper end portion of the snow removing portion 51D. The snow SN moves along an arc having a large radius of curvature, and hence a large force is required to push the snow SN. Moreover, because the chord CH is inclined relative to the ground Gr, it is difficult to attach the snow removing portion 51D to the vehicle body frame.

Shown in FIG. 12E is a fourth snow removing portion 51E to be compared with the snow removing portion 51. The snow removing portion 51E has an arc-shaped cross-section. The snow removing portion 51E is inclined forwardly with a lower end portion e thereof placed on the ground Gr, such that a given angle β3 (obtuse angle) is provided between the ground Gr and a chord CH extending between the lower end portion e and an upper end portion of the snow removing portion 51E. The snow removing portion 51E compresses snow SN placed at the front thereof, whereby a large force is undesirably required to push the snow SN. Further, because the chord CH is inclined relative to the ground Gr, it is difficult to attach the snow removing portion 51E to the vehicle body frame.

Reference is made to FIG. 13 showing an alternative snow shoveling machine obtained by modifying the machine 10 according to the present invention. The container 19 and the snow removing member 50 are omitted for clarity.

The modified snow shoveling machine 10 has right and left wheels 12, 12 as driving wheels disposed side by side in a widthwise central portion of the frame 11. More specifically, the right and left wheels 12, 12 are disposed on an axle 27 and adjoin to each other. In all other material respects, the snow shoveling machine 10 of FIG. 13 is identical to that as described with reference to FIG. 1 to FIG. 11. Therefore, parts corresponding to those as discussed with reference to FIG. 1 to FIG. 13 are denoted by like reference numerals, and their description is omitted.

Figure 14:
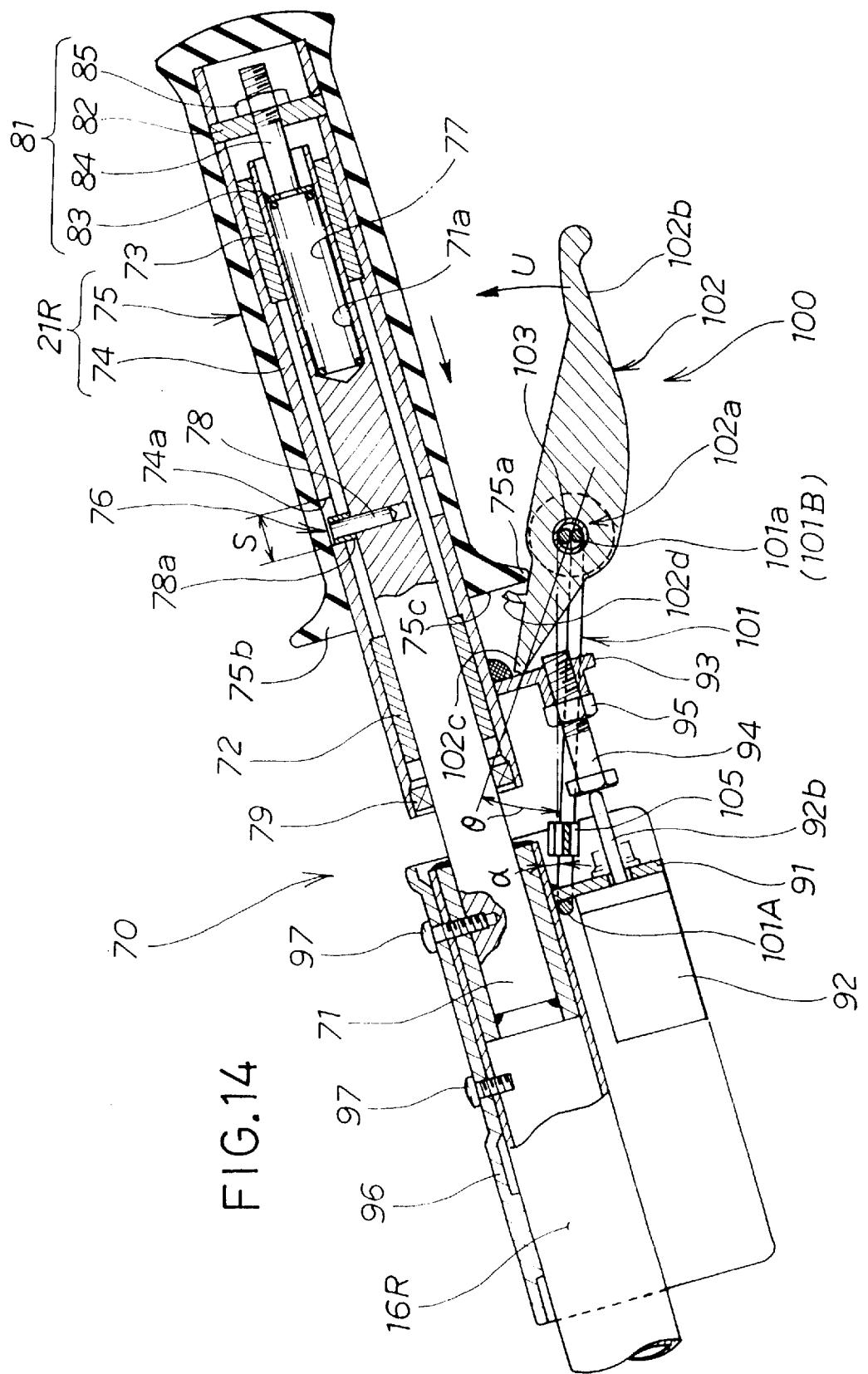
FIG. 14 shows a first alternative operation mechanism obtained by modifying the operation mechanism of FIG. 8 such that an operation-assist mechanism is provided therein.
Figure 15:
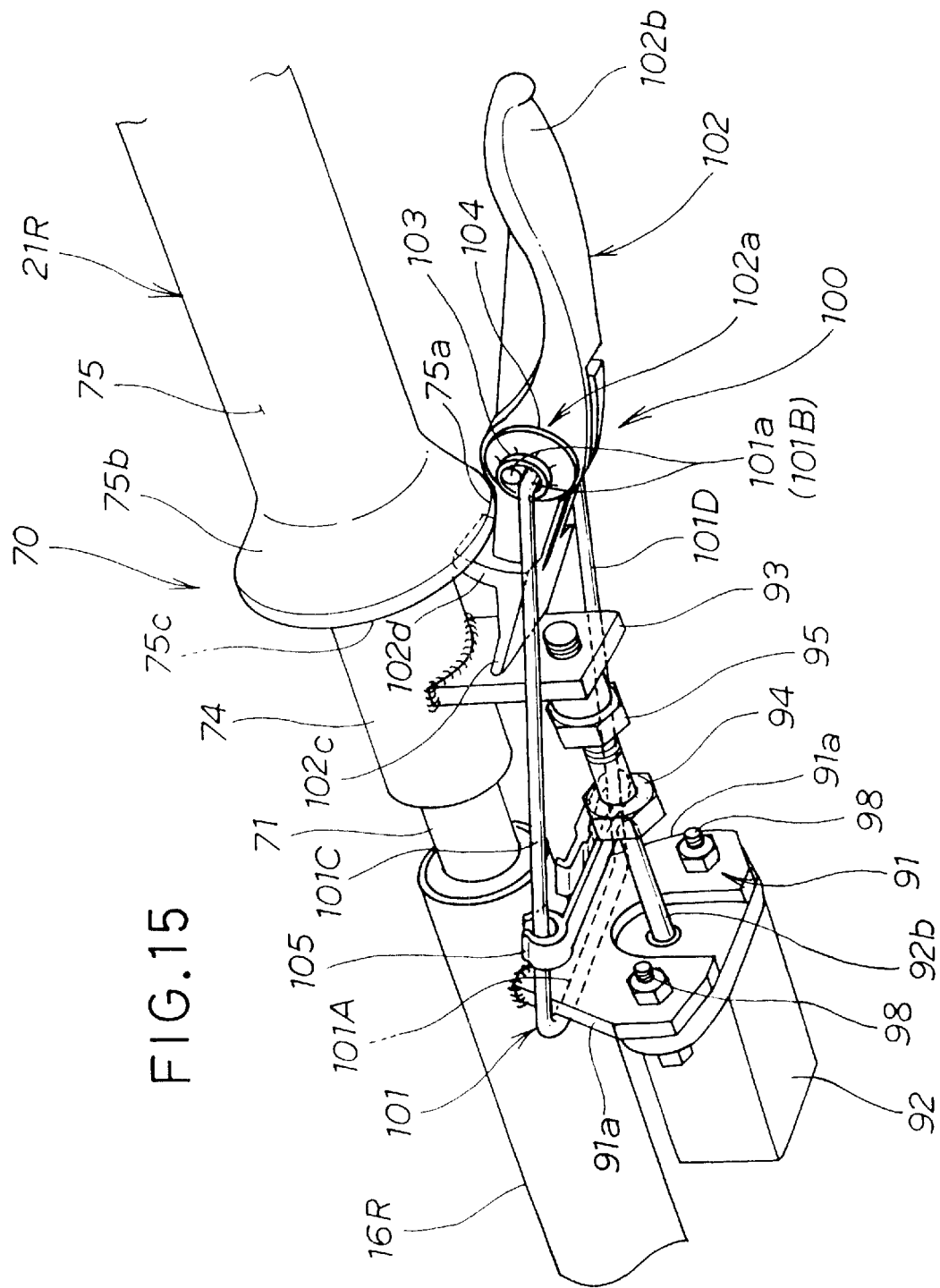
FIG. 15 shows in detail the operation-assist mechanism shown in FIG. 14.

Referring to FIGS. 14 and 15, there is shown a first alternative operation mechanism obtained by modifying the operation mechanism 70 as shown in FIG. 8.

The operation mechanism as shown in FIG. 14 is identical to the operation mechanism 70 as shown in FIG. 9 except that the former includes an operation-assist mechanism 100. More specifically, the handle 16R has the operation-assist mechanism 100 for pushing the grip 21R towards the vehicle body frame 11 by subjecting the slidable grip 21R to an assist operation with a hand holding the grip 21R.

As shown in FIGS. 14 and 15, a loop member 101 includes one end portion 101A held by the bracket 91 so that the end portion 101A swings in such a direction as to come into and out of contact with the grip 21R. The loop portion 101 extends substantially along a longitudinal direction of the bar 71. More specifically, the loop member 101 extends backwardly of the grip 21R beyond the arm 93 secured to the sliding portion 74. The loop member 101 includes another end portion 101B held by a longitudinally intermediate portion 102a of an auxiliary lever 102 which swings in the same direction as the loop member 101. The lever 102 has a finger catching portion 102b at its one end. At another end of the lever 102, there is formed a push portion 102c inclined towards the operational handle 16R at a predetermined angle θ to the loop member 101. The push portion 102C abuts on the arm 93. A projection supporting portion 75a projects from the grip 21R and contacts a portion between the intermediate portion 102a of the lever 102 and the push portion 102c. The projection supporting portion 75a serves as a fulcrum on which the lever 92 turns. The projection supporting portion 75a forms the outer peripheral surface of a grip guard portion 75b provided at an end portion of the grip portion 75.

The bracket 91 is secured to the end portion of the handle 16R. The bracket 91 extends perpendicularly to a longitudinally extending center axis of the handle 16R. Also, the bracket 91 extends in parallel to the arm 93. Therefore, the bracket 91 and the arm 93 are opposed to each other.

The loop member 101 is formed by bending such a resilient wire article as a piano wire and then laying bent end portions 101a, 101a one over the other. The loop member 101 extends in the same direction as the handle 16R and substantially takes the form of a rectangle. The end portions 101a, 101a form the end portion 101B in cooperation with each other.

The intermediate portion 102a of the lever 102 has a supported structure comprised of a supported pipe 103 fitted into an aperture formed in the lever 102, and push nuts 104, 104 provided on outer peripheral surfaces of both end portions of the pipe 103. The pipe 103 is pressed into the nuts 104, 104. The nuts 104, 104 are provided for preventing the pipe 103 from coming out. The end portions 101a, 101a of the loop member 101 are inserted into the pipe 103 through right and left sides of the pipe 103, respectively. With this arrangement, the intermediate 102a is supported such that the lever 102 swings in the manner as discussed above.

The bracket 91 takes the form of a trapezoid and includes right and left sloped locking portions 91a, 91a provided rightwardly and leftwardly thereof. Because the locking portions 91a, 91a hold the end portion 101A of the loop member 101, the loop member 101 is swingably supported by the bracket 91. Both of the locking portions 91a, 91a extend outwardly and downwardly to thereby limit the swinging motion of the loop member 101 away from the handle 16R. In other words, the locking portions 91a, 91a serves as a stopper mechanism for limiting a separation swing angle a as shown in FIG. 14. These locking portions are hereinafter referred to as first stoppers 91a, 91a.

The loop member 101 is disposed to have the limited separation swing angle a, whereby the push portion 102c of the lever 102 abuts on a predetermined position on the arm 93. Consequently, the position of the arm 93 on which the push portion 102c abuts is substantially fixed. Thus, the position of the finger catching portion 102b of the lever 102 is also fixed.

The loop member 101 includes right and left linear portions 101D, 101C both detachably supported by a second stopper 105.

The grip portion 75 has the grip guard portion 75b protruding radially from the end portion thereof. A third stopper 75c forming a surface of the grip guard portion 75b is opposed to the arm 93. The lever 102 includes a projecting portion 102d formed integrally therewith.

The second and third stoppers 105, 75c as well as the first stopper 91a, 91a are provided for limiting the separation swing angle α. The bracket 91 is attached to the detector 92 through bolts and nuts 98, 98.

Discussion will be made as to the operation of the operation-assist mechanism 100 with reference to FIG. 14.

With a hand grasping the grip 21R and with the fingers of the hand on the finger catching portion 102b, the lever 102 is pushed upwardly as shown by an arrow U, whereupon the push portion 102c pushes a back surface of the arm 93 towards the handle 16R. A force having the same magnitude as the pushing force that pushes the arm 93 is then applied to the resilient member 77 through the sliding portion 74, the bolt mounting sheet 82, the adjustment bolt 84, and the plain washer 83. Thus, the grip 21R is slid by an amount of movement corresponding to the force that pushes up the finger catching portion 102b.

That is, the force that pushes up the lever 102 is converted into a force that slides the grip 21R towards the handle 16R. Since the grip 21R is slid the amount of movement corresponding to the force that pushes up the finger catching portion 102b, the detector 92 detects such an amount of movement to thereby outputs the electric signal. Then, the controlling device 31 supplies the control signal to the motor 13 on the basis of the electric signal thus output from the detector 92. The electric signal output from the detector 92 varies in correspondence to the force that pushes up the finger catching portion 102b. The device 31 controls in such a manner as to cause the motor 13 to produce the corresponding assisting motive power. With this arrangement, the assisting motive power is generated on the basis of the operation of the lever 102 to thereby assist the operator M in operating the machine 10.

When the fingers cease to push up the finger catching portion 102b, the grip 21R and the lever 102 are returned to their original positions by the repelling force produced by the resilient member 77. Consequently, the detector 92 does not output the electric signal.

The first alternative operation mechanism 70 thus arranged is advantageous not only in that the grip 21R is pushed by the force larger than a predetermined force to thereby automatically adjust the assisting motive power, but also in that the auxiliary lever 102 is operated to thereby freely generate the assisting motive power without depending on the force that pushes the grip 21R. Therefore, the snow shoveling machine can be propelled with the force smaller than the predetermined force that pushes the grip 21R.

Reference is made next to FIGS. 16 to 19 showing a second alternative operation mechanism according to the present invention.

Figure 16A:
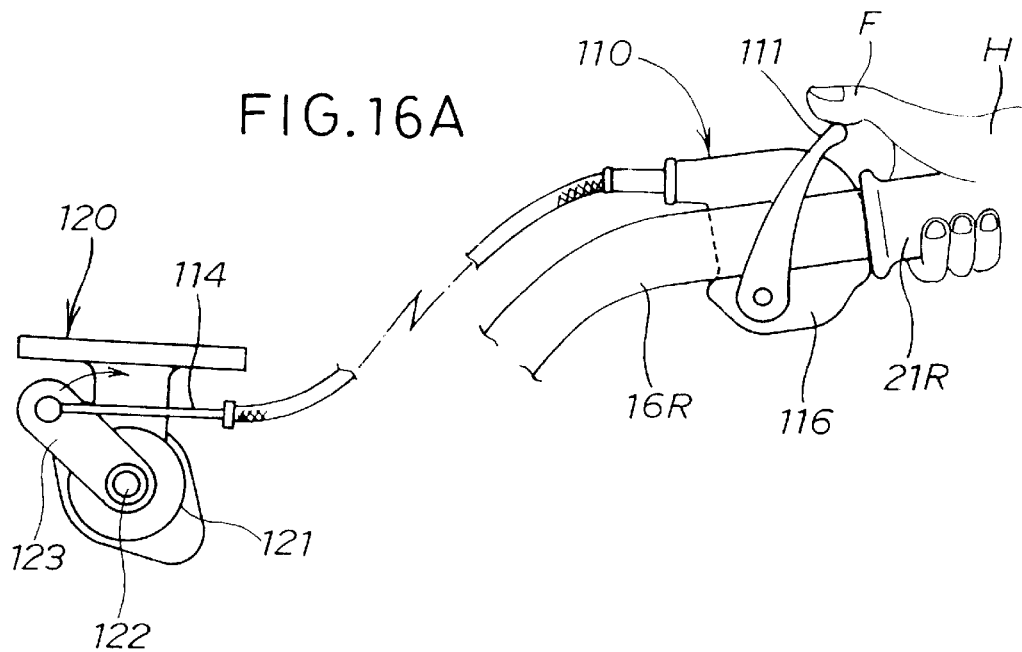
FIGS. 16A and 16B illustrates a second alternative operation mechanism obtained by modifying the operation mechanism of FIG. 8.
Figure 16B:
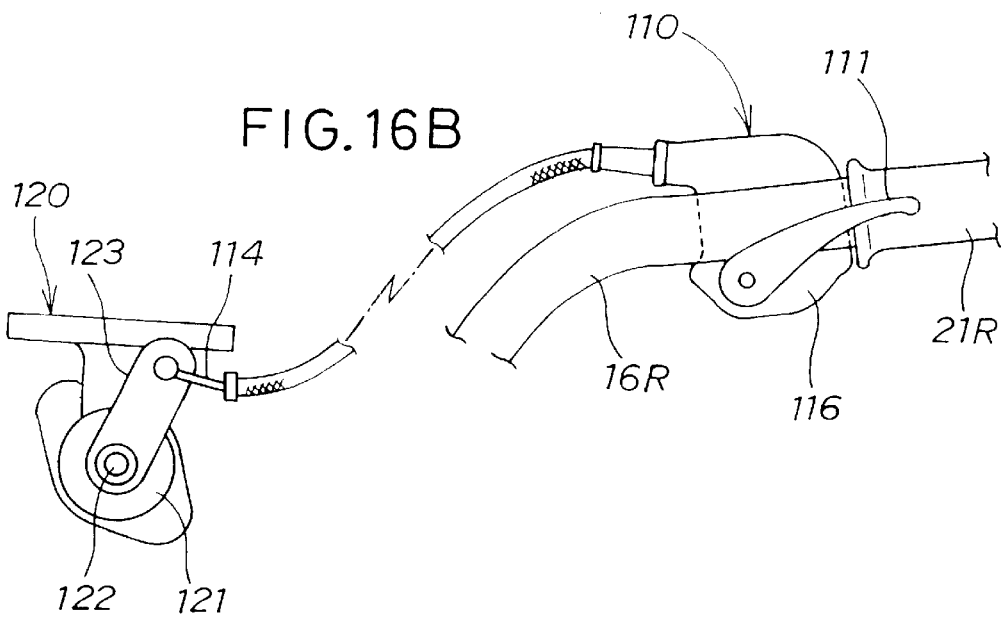

FIG. 16A and FIG. 16B schematically show the construction of the second alternative operation mechanism.

As shown in FIGS. 16A and 16B, the operation mechanism for the snow shoveling machine comprises a control lever mechanism 110. The control lever mechanism 110 includes a control lever 111. When the lever 111 is turned by a thumb F to pull a throttle wire 114, a potentiometer 120 is operated.

The potentiometer 120 comprises a rheostat including a case 121, a pin 122, and a lever 123 mounted to the case 121 through the pin 122. When the throttle wire 114 is pulled to turn the lever 123, the pin 122 is rotated to thereby move a sliding contact (not shown) incorporated in the case 121. The pin 122 is provided with a torsion spring for usually urging the pin 122 in such a manner that the pin 122 is automatically returned to its original state in which the pin 122 is not turned.

In the second alternative operation mechanism, since the potentiometer 120 is directly connected to the electric motor 13 as shown in FIG. 9, the motor 13 can be directly controlled with the potentiometer 120. Thus, a voltage supplied to the motor 13 is controlled by the control lever 111 through the potentiometer 120.

In lieu of the detector 92 as shown in FIG. 9, the potentiometer 120 may be connected to the device 31. In this case, the device 31 functions to control the motor 13 in correspondence to an output from the potentiometer 120. For example, the device 31 controls a voltage provided to the motor 13.

Reference is made to FIG. 17 showing in top plan the control lever mechanism 110 of FIG. 16A serving as the operation mechanism. The lever 111 of the control lever mechanism 110 is disposed in the proximity of the right grip 21R. In other words, the lever is provided on a side of the widthwise central portion of the machine. More specifically, the lever 111 is disposed in such a position as to be operated by the thumb F of a right hand H grasping the grip 21R.

The control lever mechanism 110 is mounted on the handles 16R by means of a mounting band referenced by numeral 117. In this embodiment, the right and left grips 21R, 21L are stationary grips that do not slide unlike the grips previously described.

Figure 18A:
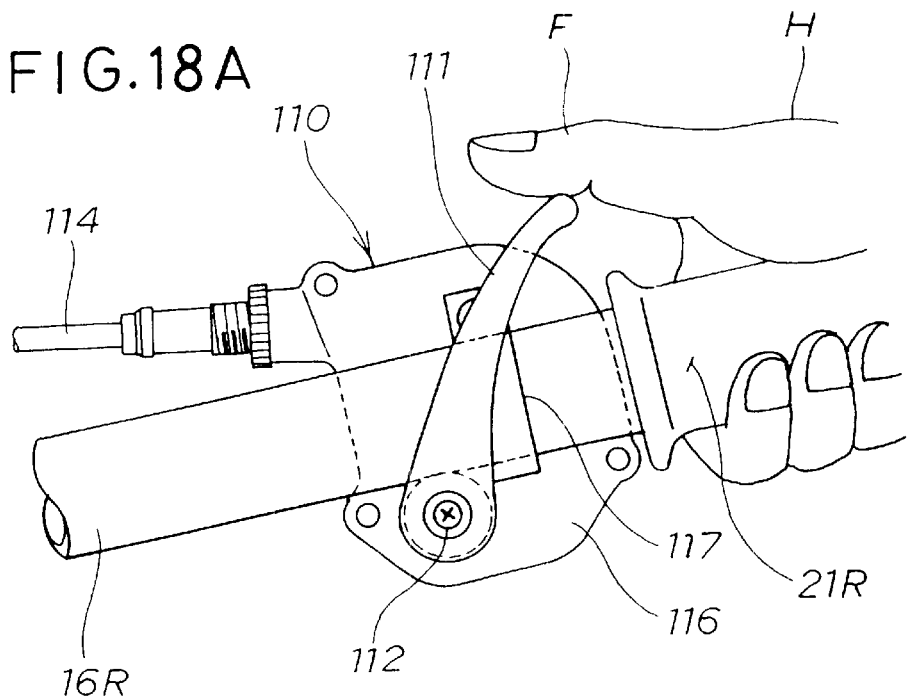
FIG. 18A is a side elevation view showing the construction of the control lever mechanism in FIG. 16A
Figure 18B:
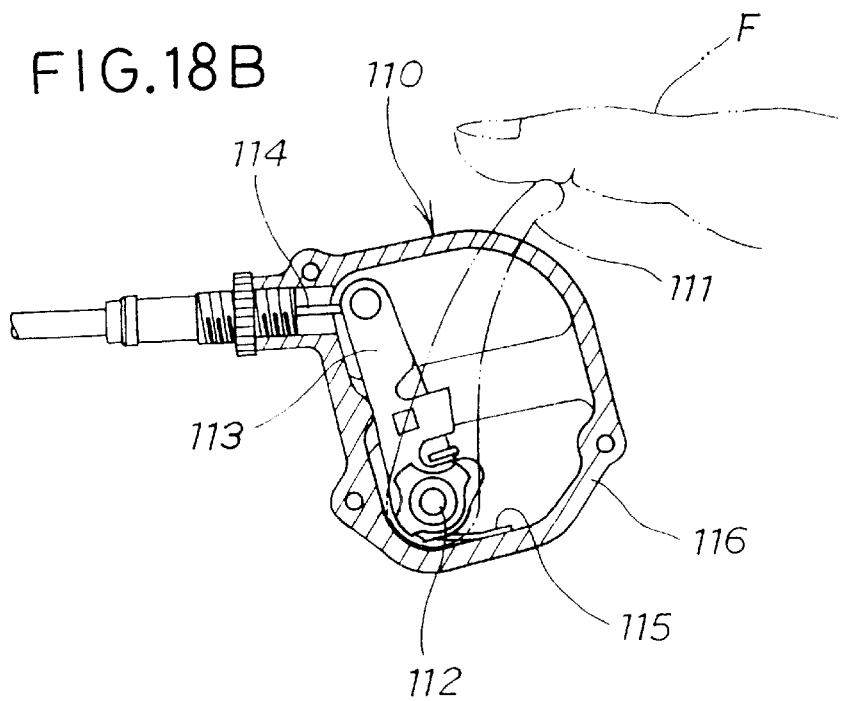
FIG. 18B is a cross-sectional view showing the inner components of the control lever mechanism in FIG. 16A.

As best shown in FIG. 18A and FIG. 18B, the control lever mechanism 110 is constructed such that the lever 111 is turned downwardly with the thumb F of the right hand H on an end portion of the lever 111 to thereby turn a relaying lever 113 on a pin 112 clockwise so as to pull the throttle wire 114 in a direction from the left to the right in this figure. The control lever mechanism 110 includes a torsion spring 115 wound on the pin 112. The relaying lever 113 is usually urged by the torsion spring 115 in such a manner as to turn counterclockwise. When the thumb F is taken off the control lever 111, the relaying lever 113 is turned counterclockwise to return the throttle wire 114 to its original state.

The pin 112 extends in a direction perpendicular to this sheet in such a manner as to pass through a case 116. The pin 112 includes a projection portion protruding from the case 116. The lever 111 is mounted on such a projection portion.

Referring back to FIG. 16A, when the thumb F is taken off the lever 111, the torsion spring 115 acts to return the lever 111 to its original state in which the lever is not operated. The lever 123 of the potentiometer 120 is also returned to its original state in which the lever 123 is not turned. Therefore, the voltage supplied to the electric motor nearly becomes zero to thereby bring the rotational speed of the motor to zero.

As shown in FIG. 16B, when the lever 111 is turned clockwise, the throttle wire 114 is pulled towards the control lever mechanism 110 to thereby turn the lever 123 of the potentiometer 120 clockwise. Consequently, the voltage provided to the motor increases to thereby increase the velocity of the snow shoveling machine.

Figure 19:
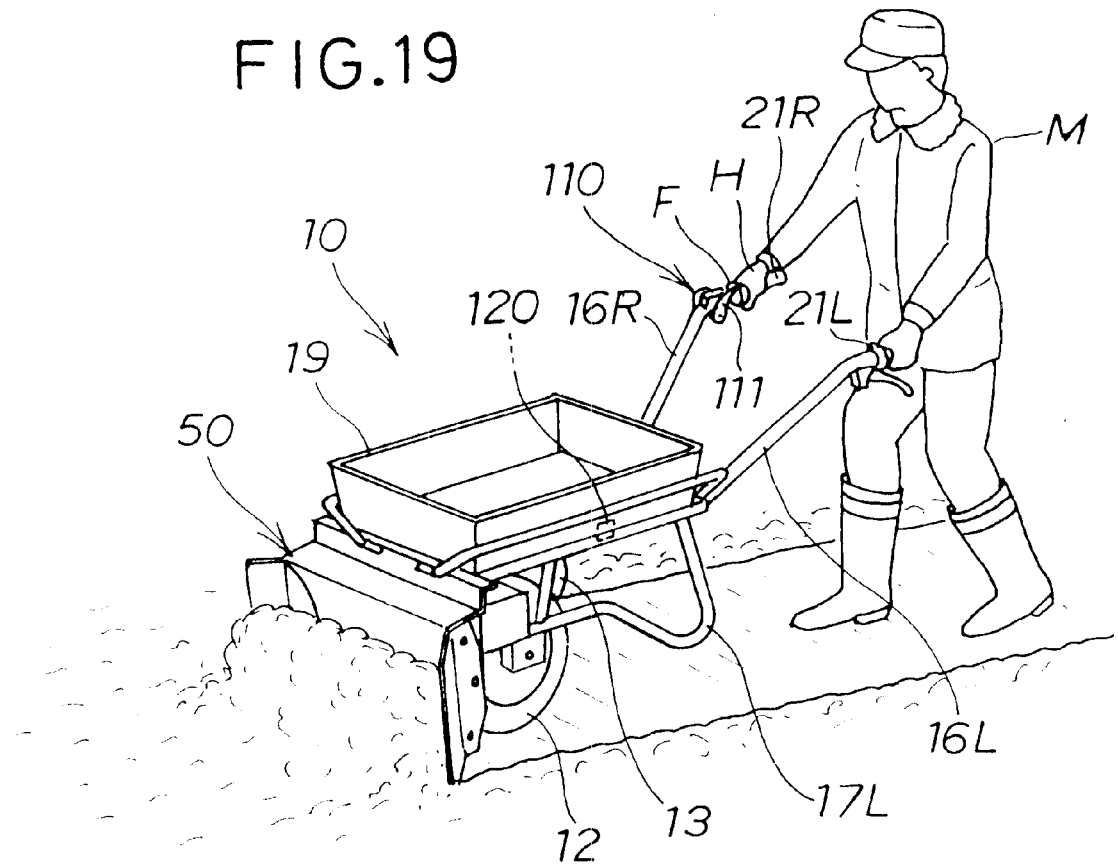
FIG. 19 shows how the snow shoveling machine employing the operation mechanism shown in FIG. 16A is used.

FIG. 19 illustrate the snow shoveling machine having the second alternative operation mechanism. As shown in this figure, the operator M propels the snow shoveling machine 10 to push snow forwardly with the snow removing member 50 so as to removal the same.

So as to propel the machine 10, the operator M lifts up the operational handles 16R, 16L with his hands grasping the right and left grips 21R, 21L, such that the stands 17R, 17L (the only left stand 17L shown) is lifted upwardly off the ground. Then, the operator M pushes the right and left grips 21R, 21L to thereby propel the machine 10 without the aid of the motive power supplied from the motor.

For propelling the traveling machine 10 with the motive power supplied from the motor 13, the operator M turns the lever 111 downwardly with his thumb F on the lever 111 and with the right hand H grasping the grip 21R. The voltage supplied to the motor 13 is then increased by means of the potentiometer 120 to thereby cause the motor 13 to generate the motive power. The machine 10 is self-propelled by such a motive power. The voltage supplied to the motor 13 increases in correspondence to the operation of the control lever 111 to thereby increase the velocity of the snow shoveling machine 10.

As is apparent from the foregoing description, the operator M lifts up the operational handles 16R, 16L with his hands grasping the grips 21R, 21L, such that the right and left stands 17R, 17L are lifted upwardly off the ground. The operator M then hand-pushes the snow shoveling machine 10 without the aid of the motive power from the motor 13. Alternatively, by operating the lever 111 with the thumb F on the lever 111 and with the hand H grasping the grips 21R, the motor 13 then generates the motive power, such that the machine 10 is self-propelled with such a motive power.

The present invention is not limited to the embodiments as described above. That is, an engine as well as the electric motor may be the drive source for the snow shoveling machine. The operation mechanism 70 or the control lever 11 may be mounted at the left operational handle 21L.

Obviously, various minor changes and modifications of the present invention are possible in the light of the above teaching. It is therefore to be understood that within the scope of the appended claims, the present invention may be practiced otherwise than as specifically described.

What is claimed is:

1. A hand-pushed snow removing vehicle comprising:
a vehicle body frame having a front part and a rear part;
a snow removing member connected directly to the front part of the vehicle body frame for removing snow from a ground surface, the snow removing member having a generally arc-shaped portion curved concavely rearward from the front part of the vehicle body frame;
a single wheel axle rotatably mounted on the vehicle body frame and disposed in a widthwise central portion thereof so that the vehicle body frame is pivotally movable about the single wheel axle;
at least one driving wheel mounted on the single wheel axle;
a drive source disposed in the vehicle body frame for driving the driving wheel;
right and left operational handles connected directly to the rear part of the vehicle body frame so that upward and downward movement of the right and left operational handles relative to the ground surface pivots the vehicle body frame relative to the single wheel axle; and
right and left grips each disposed at an end portion of a respective one of the right and left operational handles;
wherein the snow removing member is disposed on the vehicle body frame relative to the driving wheel such that when the right and left operational handles are moved upward during removal of snow by the snow removing member, the vehicle body frame and the snow removing member pivot about the single wheel axle so that the front part of the vehicle body frame is inclined downwardly relative to the ground surface and both the driving wheel and a lower end portion of the snow removing member contact the ground surface or a surface of the snow and a chord of the arc-shaped portion extends generally perpendicular to the surface of the ground.

2. A hand-pushed snow removing vehicle according to claim 1; wherein the snow removing member has a width which does not exceed a distance between the right and left grips.

3. A hand-pushed snow removing vehicle according to claim 1; wherein the arc-shaped portion has a reinforcing rib extending obliquely upwardly and rearwardly from a lower end of the arc-shaped portion.

4. A hand-pushed snow removing vehicle according to claim 1; wherein the at least one driving wheel comprises a single driving wheel; and wherein the drive source comprises an electric motor for driving the single driving wheel.

5. A hand-pushed snow removing vehicle according to claim 4; further comprising a plurality of batteries for supplying electrical power to the electric motor, the batteries being disposed between the snow removing member and the axle on which the single driving wheel is mounted.

6. A hand-pushed snow removing vehicle according to claim 4; wherein one of the right and left grips comprises a slidable grip for undergoing sliding movement in accordance with an operation force by a human hand; and further comprising a detector for detecting an amount of movement of the slidable grip to control the electric motor, the detector being disposed proximate to the slidable grip.

7. A hand-pushed snow removing vehicle according to claim 6; wherein one of the right and left operational handles has an operation-assist mechanism for forcibly pushing the slidable grip towards the vehicle body frame.

8. A hand-pushed snow removing vehicle according to claim 7; further comprising stands disposed at a rear part of the vehicle body frame for supporting the snow removing vehicle on the surface of the ground, the snow removing vehicle being operated with the right and left operational handles so that the stands are lifted upwardly off the ground surface; and further comprising a control lever disposed proximate one of the right and left grips for controlling a voltage applied to the electric motor.

9. A hand-pushed snow removing vehicle according to claim 1; further comprising a container disposed at an upper portion of the vehicle body frame for collecting snow removed by the snow removing member.

10. A hand-pushed snow removing vehicle according to claim 1; wherein the snow removing member is made of a single sheet of material.

11. A hand-pushed snow removing vehicle according to claim 1; wherein the snow removing member is disposed on the vehicle body frame relative to the driving wheel such that when the right and left operational handles are moved downward, the vehicle body frame and the snow removing member pivot about the single wheel axle so that the front part of the vehicle body frame is inclined upwardly relative to the ground surface and both the driving wheel and the lower end portion of the snow removing member do not contact the ground surface or a surface of the snow.

12. A snow removing vehicle comprising: a vehicle body frame having a front part and a rear part; a snow removing member connected directly to the front part of the vehicle body frame for removing snow from a ground surface, the snow removing member having a generally arc-shaped portion curved concavely rearward from the front part of the vehicle body frame; a single wheel axle rotatably mounted on the vehicle body frame and disposed in a widthwise central portion thereof so that the vehicle body frame is pivotally movable about the single wheel axle; at least one wheel mounted on the single wheel axle; a drive source disposed on the vehicle body frame for generating an assisting power to rotate the wheel; and a pair of operational handles connected directly to the rear part of the vehicle body frame so that upward and downward movement of the operational handles relative to the ground surface pivots the vehicle body frame relative to the single wheel axle; wherein the snow removing member is disposed on the vehicle body frame relative to the wheel such that when the operational handles are moved upward during removal of snow by the snow removing member, the vehicle body frame and the snow removing member pivot about the single wheel axle so that the front part of the vehicle body frame is inclined downwardly relative to the ground surface and both the wheel and a lower end portion of the snow removing member contact the ground surface or a surface of the snow and a chord of the arc-shaped portion extends generally perpendicular to the surface of the ground.

13. A snow removing vehicle according to claim 12; further comprising a pair of grips each provided at an end portion of a respective one of the operational handles.

14. A snow removing vehicle according to claim 13; wherein one of the grips is slidably provided at the end portion of the respective operational handle so that the drive source is actuated to generate the assisting power by sliding movement of the slidable grip.

15. A snow removing vehicle according to claim 12; further comprising a container mounted on the vehicle body frame for collecting snow removed by the snow removing member.

16. A snow removing vehicle according to claim 12; wherein the wheel is located at a central part of the vehicle body frame in a widthwise direction thereof.

17. A snow removing vehicle according to claim 12; wherein the arc-shaped portion of the snow removing member has a reinforcing rib extending obliquely upwardly and rearwardly from a lower end of the arc-shaped portion.

18. A snow removing vehicle according to claim 12; wherein the snow removing member is disposed on the vehicle body frame relative to the wheel such that when the operational handles are moved downward, the vehicle body frame and the snow removing member pivot about the single wheel axle so that the front part of the vehicle body frame is inclined upwardly relative to the ground surface and both the wheel and a lower end portion of the snow removing member do not contact the ground surface or a surface of the snow.

19. A snow removing vehicle comprising: a vehicle body frame having a front part and a rear part; a single wheel axle rotatably mounted on the vehicle body frame and disposed in a widthwise central portion thereof so that the vehicle body frame is pivotally movable about the single wheel axle; at least one wheel mounted on the single wheel axle; a drive source disposed on the vehicle body frame for generating an assisting power to rotate the wheel to drive the vehicle body frame in a forward direction; a pair of operational handles connected directly to the rear part of the vehicle body frame so that upward and downward movement of the operational handles relative to the ground surface pivots the vehicle body frame relative to the single wheel axle; and a snow removing member connected directly to the front part of the vehicle body frame and having a generally arc-shaped snow removing portion having a curved surface for removing snow from a ground surface by pushing the snow forwardly when the vehicle body frame is driven in the forward direction, the snow removing portion having a lower end for contacting the surface of the ground during snow removal and an upper end, and the curved surface of the snow removing portion having a radius of curvature sufficiently small so that snow falls downwardly from the curved surface and does not reach the upper end of the snow removing portion as the snow is pushed forwardly by the snow removing portion; wherein the snow removing member is disposed on the vehicle body frame relative to the wheel such that when the operational handles are moved upward during removal of snow by the snow removing member, the vehicle body frame and the snow removing member pivot about the single wheel axle so that the front part of the vehicle body frame is inclined downwardly relative to the ground surface and both the wheel and a lower end of the snow removing member contact the ground surface or a surface of the snow.

20. A snow removing vehicle according to claim 19; wherein a chord of the snow removing portion extends generally perpendicular to the surface of the ground during removal of snow from the surface of the ground by the snow removing portion.

21. A snow removing vehicle according to claim 19; further comprising a pair of grips each provided at an end portion of a respective one of the operational handles.

22. A snow removing vehicle according to claim 21; wherein one of the grips is slidably provided at the end portion of the respective operational handle so that the drive source is actuated to generate the assisting power by sliding movement of the slidable grip.

23. A snow removing vehicle according to claim 19; wherein the snow removing member is disposed on the vehicle body frame relative to the wheel such that when the operational handles are moved downward during removal of snow by the snow removing member, the vehicle body frame and the snow removing member pivot about the single wheel axle so that the front part of the vehicle body frame is inclined upwardly relative to the ground surface and both the wheel and a lower end of the snow removing member do not contact the ground surface or a surface of the snow.

* * * * *